(12) United States Patent  
Ye

(10) Patent No.: US 12,137,031 B2  
(45) Date of Patent: Nov. 5, 2024

(54) METHOD AND SYSTEM OF NETWORK CONFIGURATION FOR DOMESTIC APPLIANCES, ELECTRONIC DEVICE, AND COMPUTER STORAGE MEDIUM

(71) Applicants: Midea Group Co., Ltd., Foshan (CN); GD Midea Air-Conditioning Equipment Co., Ltd., Foshan (CN)

(72) Inventor: Xiongbin Ye, Foshan (CN)

(73) Assignees: MIDEA GROUP CO., LTD., Foshan (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 0 days.

(21) Appl. No.: 18/220,793

(22) Filed: Jul. 11, 2023

(65) Prior Publication Data

US 2023/0353454 A1 Nov. 2, 2023

Related U.S. Application Data

(63) Continuation of application No. PCT/CN2022/129533, filed on Nov. 3, 2022.

(30) Foreign Application Priority Data

Nov. 8, 2021 (CN) .......................... 202111316091.6

(51) Int. Cl.
*H04L 12/28* (2006.01)
*H04B 17/318* (2015.01)
(Continued)

(52) U.S. Cl.
CPC ....... *H04L 41/0846* (2013.01); *H04B 17/318* (2015.01)

(58) Field of Classification Search
None
See application file for complete search history.

(56) References Cited

U.S. PATENT DOCUMENTS 10,917,258 B2 * 2/2021 Tobella ............... H04L 12/2854
11,533,225 B2 * 12/2022 Tao .......................... H04L 41/12
(Continued)

FOREIGN PATENT DOCUMENTS

CN 110958665 A * 4/2020 ............ H04W 48/16
CN 108173720 B * 9/2020 ......... H04L 12/2816
(Continued)

OTHER PUBLICATIONS

Midea Group Co., Ltd., ISR, PCT/CN2022/129533, Jan. 19, 2023, 2 pgs.

*Primary Examiner* — Christopher B Robinson
(74) *Attorney, Agent, or Firm* — Morgan, Lewis & Bockius LLP

(57) ABSTRACT

Provided are a method and a system of network configuration for domestic appliances, an electronic device, and a computer storage medium. The method includes: receiving a network configuration request and determining a plurality of network configuration appliances, wherein the plurality of network configuration appliances comprise an appliance that is to be configured with a network and at least two appliances that have been configured with the network; obtaining environmental information of the appliances that have been configured with the network, allocating, based on the environmental information, the appliance that is to be configured with the network to a corresponding appliance that has been configured with the network; and performing network configuration on the appliance to be configured with the network based on a corresponding appliance that has been configured with the network and is allocated to the corresponding appliance.

14 Claims, 9 Drawing Sheets

(51) Int. Cl.
  *H04L 41/084*     (2022.01)
  *H04M 1/72415*    (2021.01)

(56) References Cited

U.S. PATENT DOCUMENTS

| | | | | |
|---|---|---|---|---|
| 2016/0127506 A1* | 5/2016 | Shinohara | ............... | H04L 41/20 |
| | | | | 709/221 |
| 2017/0163438 A1* | 6/2017 | Gary, Jr. | ............... | H04L 67/563 |
| 2019/0109723 A1* | 4/2019 | Ebrom | ................ | H05B 6/688 |

FOREIGN PATENT DOCUMENTS

| CN | 111867001 A | 10/2020 | | |
|---|---|---|---|---|
| CN | 111867007 A | 10/2020 | | |
| CN | 112752324 A | 5/2021 | | |
| CN | 112929224 A | 6/2021 | | |
| KR | 101716855 B1 * | 3/2017 | ............ | H04W 76/02 |

\* cited by examiner

METHOD AND SYSTEM OF NETWORK CONFIGURATION FOR DOMESTIC APPLIANCES, ELECTRONIC DEVICE, AND COMPUTER STORAGE MEDIUM

CROSS REFERENCE TO RELATED APPLICATIONS

The present disclosure is a continuation application of the international patent application No. PCT/CN2022/129533, filed on Nov. 3, 2022, which claims priority of Chinese patent application No. 202111316091.6, filed on Nov. 8, 2021, and the contents of which are incorporated herein by its entireties.

TECHNICAL FIELD

The present disclosure relates to the field of internet of things, and in particular to a method and a system of network configuration for domestic appliances, an electronic device, and a computer storage medium.

BACKGROUND

In smart home scenarios, a plurality of domestic appliances may be needed to be connected to a network. A user needs to configure the network for each of the plurality of domestic appliances independently. The user may perform operations repetitively, and much time may be consumed, such that an efficiency of network configuration may be low, and the user may not perform the operations conveniently.

SUMMARY OF THE DISCLOSURE

The present disclosure provides a method and a system of network configuration for domestic appliances, an electronic device, and a computer storage medium, to improve the efficiency of network configuration.

To solve the above technical problem, an aspect of the present disclosure is to provide a method of network configuration for domestic appliances. The method includes: receiving a network configuration request and determining a plurality of network configuration appliances, wherein the plurality of network configuration appliances comprise an appliance that is to be configured with a network and at least two appliances that have been configured with the network; obtaining environmental information of the appliances that have been configured with the network, allocating, based on the environmental information, the appliance that is to be configured with the network to a corresponding one of the at least two appliances that have been configured with the network; performing network configuration on the appliance to be configured with the network based on a corresponding appliance that has been configured with the network and is allocated to the corresponding appliance.

To solve the above technical problem, another aspect of the present disclosure is to provide a system of network configuration for domestic appliances. The system includes: a terminal, configured to generate a network configuration request; a cloud, communicatively connected to the terminal and configured to receive the network configuration request and determine a plurality of network configuration appliances, wherein the plurality of network configuration appliances comprise an appliance that is to be configured with the network and at least two appliances that have been configured with the network. The cloud is further configured to: obtain environmental information of the appliances that have been configured with the network; allocate, based on the environmental information, the appliance that is to be configured with the network to a corresponding one of the at least two appliances that have been configured with the network; and take the corresponding appliance that has been configured with the network to perform network configuration on the appliance, which is to be configured with the network and is allocated to the corresponding appliance that has been configured with the network.

To solve the above technical problem, still another aspect of the present disclosure is to provide an electronic device, including a processor and a memory coupled to the processor. The processor is configured to execute program data stored in the memory to perform the method of performing network configuration on domestic appliances as described in any of the above aspects.

To solve the above technical problem, still another aspect of the present disclosure is to provide a computer storage medium, having program data stored thereon. The program data is configured to, when being executed, perform the method of performing network configuration on domestic appliances as described in any of the above aspects.

BRIEF DESCRIPTION OF THE DRAWINGS

In order to illustrate technical solutions of embodiments of the present disclosure or in the related art more clearly, accompanying drawings for the embodiments will be illustrated in brief below. Obviously, the accompanying drawings in the following description show only some of the embodiments of the present disclosure, and that other accompanying drawings may be obtained based on these drawings by any ordinary skilled person in the art without any creative effort.

DETAILED DESCRIPTION

The present disclosure will be described in further detail below by referring to the accompanying drawings and embodiments. Specifically, it is noted that, the following embodiments are intended to illustrate the present disclosure only, but do not limit the scope of the present disclosure. Likewise, the following embodiments are only some but not all embodiments of the present disclosure. All other embodiments, which are obtained without creative work by any ordinary skilled person in the art, shall fall within the scope of the present disclosure.

In the description of the embodiments of the present disclosure, it is to be noted that, unless otherwise expressly specified and limited, the terms "connected" and "coupled" shall be understood in a broad sense. For example, connection may be fixed connection, detachable connection or integral connection; mechanical connection or electrical connection; direct or indirect connection through an intermediate medium. Any ordinary skilled person in the art shall understand a specific meaning of the above terms based on a specific case described in the present disclosure.

In the embodiments of the present disclosure, unless otherwise expressly specified and limited, a first feature being "above" or "below" a second feature may be the first feature directly contacting the second feature or the first feature indirectly contacting the second feature through an intermediate medium. Furthermore, the first feature being "above", "on top of" and "on" the second feature may mean that the first feature is directly above or diagonally above the second feature, or simply mean that the first feature is horizontally higher than the second feature. The first feature being "below", "under" and "at a bottom of" the second feature may mean that the first feature is directly below or diagonally below the second feature, or simply mean that the first feature is horizontally lower than the second feature.

Figure 1:
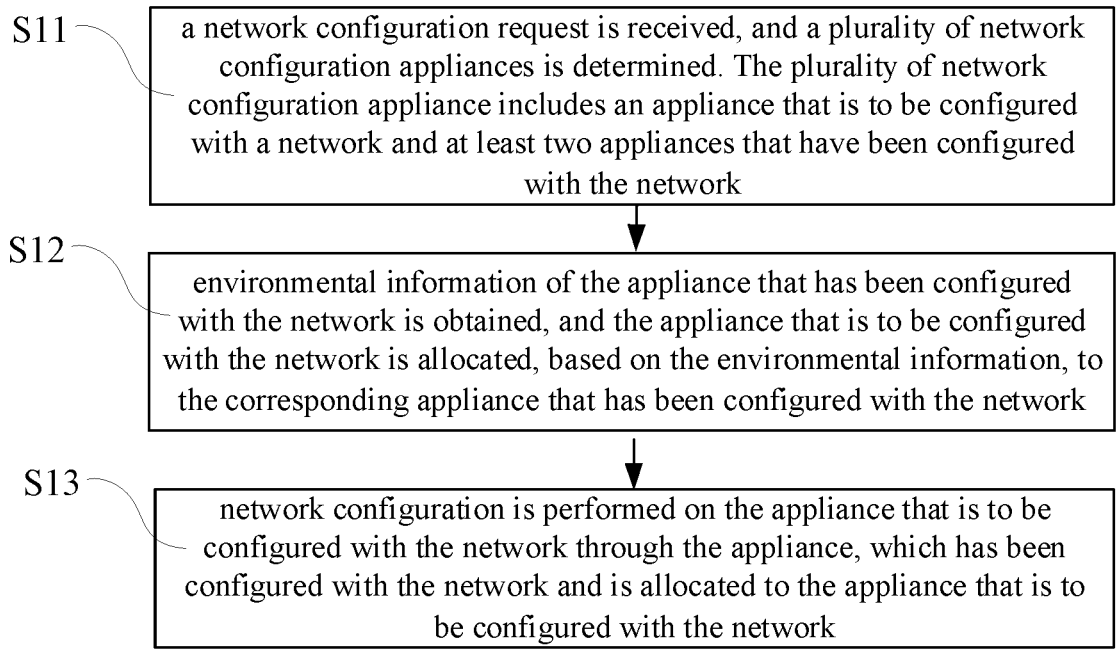
FIG. 1 is a flow chart of a method of network configuration for domestic appliances according to some embodiments of the present disclosure.

The present disclosure provides a method of network configuration for domestic appliances. As shown in FIG. 1, FIG. 1 is a flow chart of a method of network configuration for domestic appliances according to some embodiments of the present disclosure. The method of network configuration for domestic appliances in the present embodiments includes the following operations.

In an operation S11, a network configuration request is received, and a network configuration appliance is determined. The network configuration appliance includes an appliance that is to be configured with a network and at least two appliances that have been configured with the network.

In the present embodiments, orientation connection may be applied for network configuration. For the orientation connection, data transfer between a sender and a receiver may be managed based on displaying communication and blocking between the sender and the receiver. A network system requires a connection to be established between the sender and the receiver before data is transferred between the sender and the receiver. In this way, reliability of the network configuration can be guaranteed.

The network configuration appliance is an appliance that can be intelligently controlled through network connection in a smart home system. The appliance that has been configured with the network is a home appliance that has been intelligently controlled through network connection before a current network configuration, and that is a home appliance that has been bound to a user terminal (a terminal that controls the domestic appliance) and may send and receive network configuration information of the user terminal, and that is, a home appliance that has a capability to configure the network. The appliance that is to be configured with the network is a domestic appliance that is not bound to the user terminal before the current network configuration and needs to be configured with the network through the user terminal.

Figure 2:
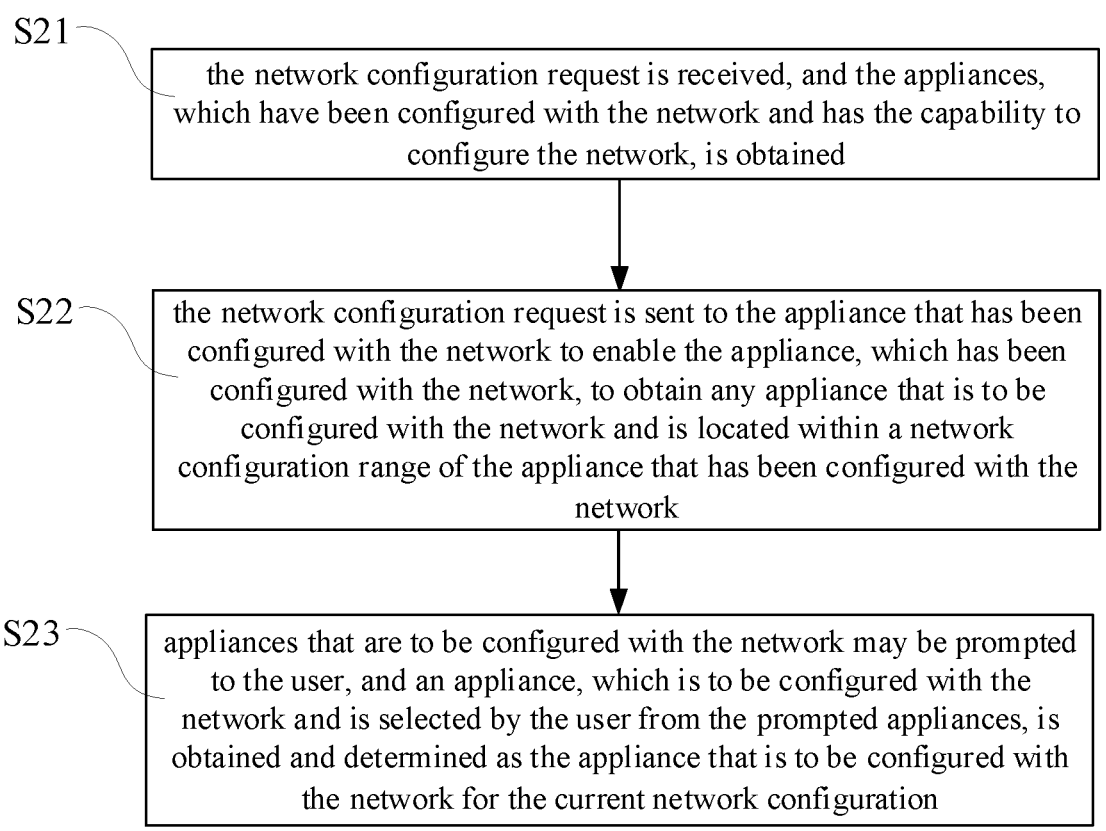
FIG. 2 is a flow chart of performing an operation S11 of the method shown in FIG. 1.

In some embodiments, in the present embodiment, the operation S11 may be achieved by performing a method as shown in FIG. 2, the method of the present embodiments includes operations S21 to S23.

In an operation S21, the network configuration request is received, and the appliances, which have been configured with the network and has the capability to configure the network, is obtained.

The user terminal may send the network configuration request to a cloud via an application (APP). The network configuration request includes identifier information of the user terminal and a request command. The cloud receives the network configuration request and queries and obtains the appliances, which have been configured with the network, have the capability of configuring the network, and correspond to the identifier information. For example, the cloud obtains a user account of the user terminal based on the identifier information finds an appliance that is bound (having the capability of configuring the network) with the user account, and determines the found appliance as the appliance that has been configured with the network. In some embodiments, the identifier information of the user terminal is the user account.

In an operation S22, the network configuration request is sent to the appliance that has been configured with the network to enable the appliance, which has been configured with the network, to obtain any appliance that is to be configured with the network and is located within a network configuration range of the appliance that has been configured with the network.

Based on the above analysis, the appliance that has been connected to the network and has the capability to configure the network is the appliance that has been configured with the network. The cloud sends the network configuration request to the appliance that has been configured with the network. The appliance that has been configured with the network receives the network configuration request from the cloud, scans a nearby hotspot through a radio, and feeds device information of the appliance corresponding to the scanned hotspot to the cloud. The cloud determines the appliance to be configured with the network based on the device information of the appliance that has been configured with the network and the device information fed back to the cloud.

The appliance that has been configured with the network obtains the appliance, which is to be configured with the network and is located within the network configuration range (in which network configuration information can be transmitted via hotspots) of the appliance that has been configured with the network. For example, the appliance, which has been configured with the network, obtains an appliance that carries a series of prefixes of hotspot names or obtains an appliance whose broadcast beacon carries specific manufacturer information, and the obtained appliance may be determined as the appliance that is to be configured with the network.

Of course, in other embodiments, the appliance that has been configured with the network may obtain, by performing other near-field communication methods (such as infrared communication, Bluetooth, and so on), the appliance that is to be configured with the network and located within the network configuration range of the appliance that has been configured with the network.

The appliance that has been configured with the network further feeds the device information, such as a device name, an ID or other identifier information, of the appliance to be configured with the network back to the cloud.

The hotspot obtained by the appliance that has been configured with the network may include hotspots of other appliances that have been configured with the network. The cloud may remove the appliances, which have been configured with the network, from the appliances, which are to be configured with the network and fed back to the cloud, based on the device information of the appliances that have been configured with the network, such that the cloud may eventually determine the appliance that is to be configured with the network.

In an operation S23, appliances that are to be configured with the network may be prompted to the user, and an appliance, which is to be configured with the network and is selected by the user from the prompted appliances, is obtained and determined as the appliance that is to be configured with the network for the current network configuration.

The cloud further prompts the device information of the determined appliance, which is to be configured with the network, to the user terminal. The user may view the appliance, which is to be configured with the network and is prompted by the cloud, through the APP of the user terminal. The user selects, on the APP, the appliance that is to be configured with the network from all appliances, which are to be configured with the network and are prompted by the cloud. Further, a list the selected appliances is formed. The list of the selected appliances that are to be configured with the network is reported to the cloud.

A conventional method of network configuration for domestic appliances includes the following. 1) Network configuration is performed for appliances one by one. The operations may be complicated, the user may have poor experience, and the efficiency of network configuration may be low. 2) Network configuration is performed for appliances in batch through broadcasting, but an appliance to be configured cannot be selected specifically, and the network configuration process is uncontrollable.

For the network distribution method of the present embodiment, the appliance that is to be configured with the network is obtained based on the appliance that has been configured with the network. The user may select, via the APP, specific appliances, which are to be configured with the network in batch, from all appliances that are to be configured with the network. Therefore, the appliances that are to be configured with the network may be flexibly selected, and network configuration may be performed on the selected appliances, such that the user may have a better experience.

In an operation S12, environmental information of the appliance that has been configured with the network is obtained, and the appliance that is to be configured with the network is allocated, based on the environmental information, to the corresponding appliance that has been configured with the network.

The environmental information includes signal strength. The appliance that has been configured with the network uploads the following to the cloud: signal strength of a network device, such as a router, a repeater or a gateway device, connected to the appliance that has been configured with the network; signal strength of each appliance, which is to be configured with the network and is scanned and obtained by the appliance that has been configured with the network; and hotspot information of the appliance that is to be configured with the network. The cloud receives a plurality of (at least two) appliances, which are to be configured with the network and are reported by the appliance that has been configured with the network, and the signal strength, and allocates the received appliances that are to be configured with the network to the corresponding appliance that has been configured with the network.

In the present embodiment, the appliance that has been configured with the network automatically finds the appliance, which is to be configured with the network and is located near the appliance that has been configured with the network. The appliance that has been configured with the network shares its own network configuration information (such as home routing information) with the appliance that is to be configured with the network, allowing the appliance that is to be configured with the network to be bound to the user account of the shared the network configuration information. In this way, the appliance that is to be configured with the network may communicate with the user terminal, such that the user may have better experience of repeated network configuration.

In addition, in the present embodiment, the plurality of appliances that are to be configured with the network are allocated through the cloud, such that the plurality of appliances that have been configured with the network may operate cooperatively, and the appliances that are to be configured with the network may be connected to the network more quickly. Further, each appliance that has been configured with the network may configure the network in batch for the plurality of appliances that are to be configured with the network, the efficiency of the network configuration is improved.

Figure 3:
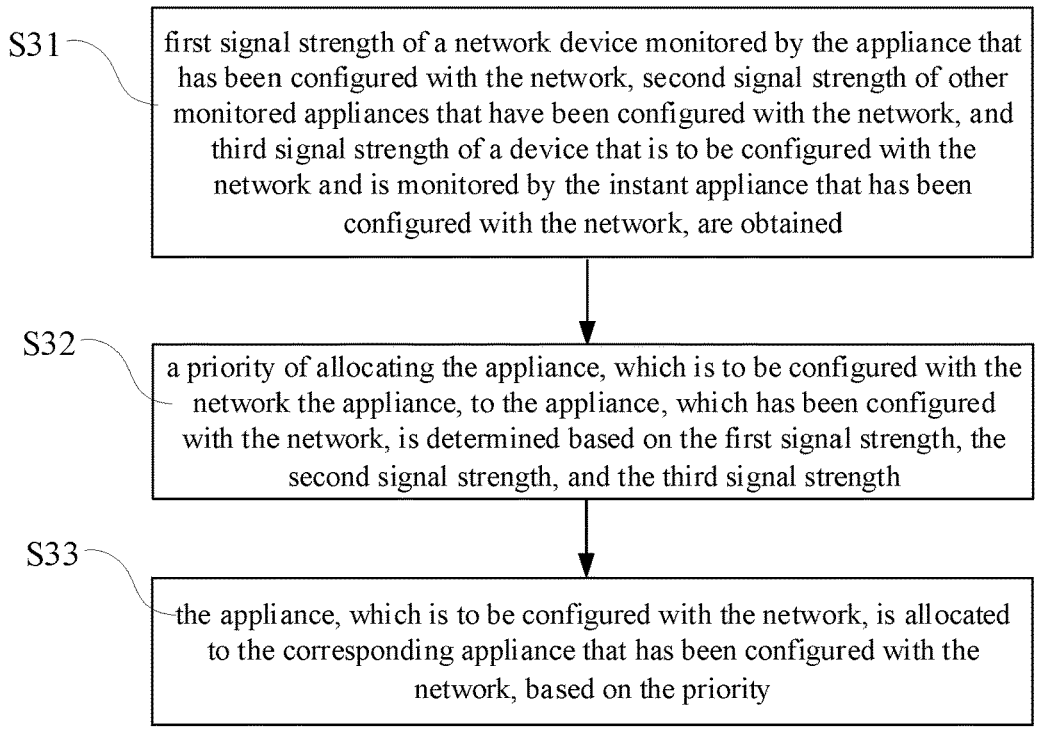
FIG. 3 is a flow chart of performing an operation S12 of the method shown in FIG. 1.

In an application scenario, various appliances that have been configured with the network are connected to various network devices. In this case, in the present embodiment, the operation S12 may be achieved by performing the method shown in FIG. 3. The method of the present embodiments includes operations S31 to S33.

In an operation S31, first signal strength of a network device monitored by the appliance that has been configured with the network, second signal strength of other monitored appliances that have been configured with the network, and third signal strength of a device that is to be configured with the network and is monitored by the instant appliance that has been configured with the network, are obtained.

Specifically, a first hotspot signal strength of the network device monitored by the appliance that has been configured with the network, a second hotspot signal strength of other network-configured appliances monitored by the instant appliance that has been configured with the network, and a third hotspot signal strength of a to-be-matched device monitored by the instant appliance that has been configured with the network, are obtained.

The appliance that has been configured with the network may be controlled to enter a mixed monitoring mode to monitor any wireless packet in the air to get the signal strength of the corresponding hotspot.

In an operation S32, a priority of allocating the appliance, which is to be configured with the network the appliance, to the appliance, which has been configured with the network, is determined based on the first signal strength, the second signal strength, and the third signal strength.

The cloud may determine, based on the first hotspot signal strength, the second hotspot signal strength, and the third hotspot signal strength, a signal transmission distance between each appliance that has been configured with the network, the appliance that is to be configured with the network, and the network device in the smart home system. Therefore, the priority of allocating the appliance, which is to be configured with the network the appliance, to the appliance, which has been configured with the network, is determined based on the above-determined hotspot signal strength, and the efficiency of network configuration is improved.

In an operation S33, the appliance, which is to be configured with the network, is allocated to the corresponding appliance that has been configured with the network, based on the priority.

As the distance between the network device and the appliance that is to be configured with the network decreases, the priority of the appliance, which has been configured with the network and corresponds to the network device (network connection is through which the network device), increases. In this way, the appliance that is to be configured with the network is ensured to be connected to a nearest network device.

In other embodiments, the priority the appliance, which has been configured with the network and is allocated to the appliance that is to be configured with the network, is determined based on environmental information such as a signal-to-noise ratio, a wireless link transmission rate or a bandwidth.

In an operation S13, network configuration is performed on the appliance that is to be configured with the network through the appliance, which has been configured with the network and is allocated to the appliance that is to be configured with the network.

Figure 4:
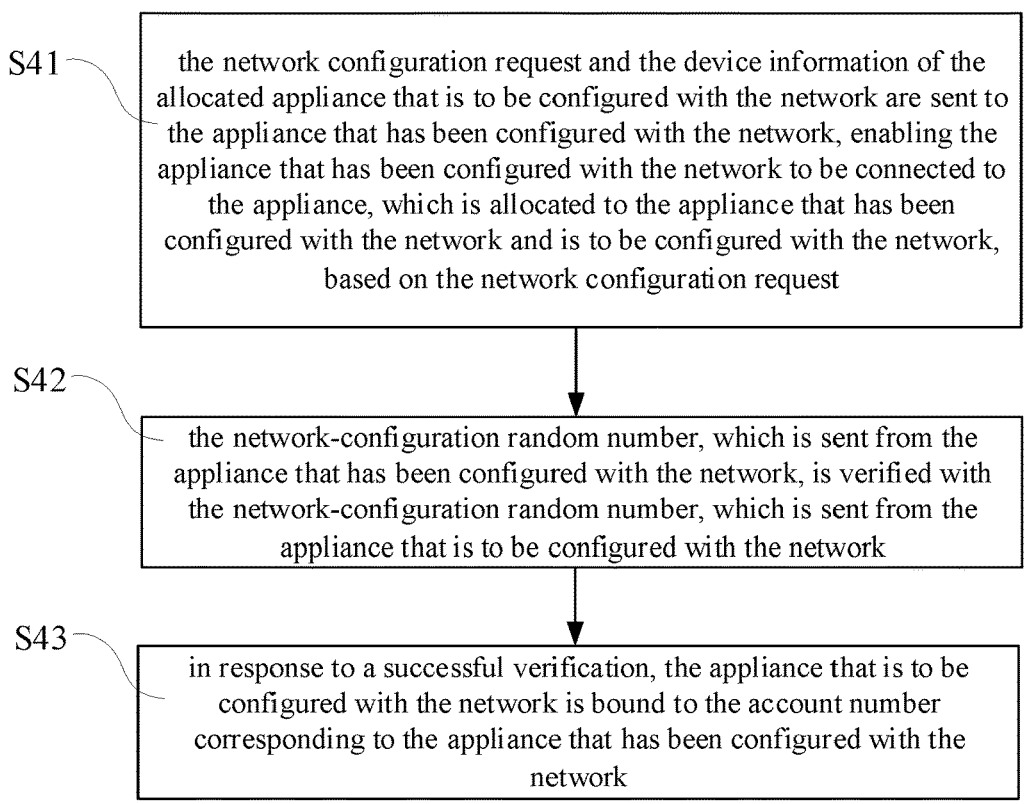
FIG. 4 is a flow chart of performing an operation S13 of the method shown in FIG. 1.

Alternatively, in the present embodiment, the operation S13 may be achieved by performing the method as shown in FIG. 4. The method of the present embodiments includes operations S41 to S43.

In the operation S41, the network configuration request and the device information of the allocated appliance that is to be configured with the network are sent to the appliance that has been configured with the network, enabling the appliance that has been configured with the network to be connected to the appliance, which is allocated to the appliance that has been configured with the network and is to be configured with the network, based on the network configuration request.

The cloud allocates the appliance, which is uploaded by the user terminal and is confirmed to be configured with the network, to the corresponding appliance that has been configured with the network. The cloud sends the network configuration request uploaded from the user terminal and the device information of the appliance, which is allocated and is to be configured with the network, to the appliance that has been configured with the network. The appliance that has been configured with the network is connected to (or through other near-field communication connection) a hotspot of the correspondingly allocated appliance that is to be configured with the network.

Further, the appliance that has been configured with the network generates a network-configuration random number and sends the network-configuration random number and recorded home router information to the allocated appliance that is to be configured with the network. The allocated appliance that is to be configured with the network successfully logs in and reports the network-configuration random number, which is obtained from the appliance that has been configured with the network, to the cloud. After the appliance that has been configured with the network completes sending the network-configuration random number and the recorded home router information, the appliance that has been configured with the network sends to the cloud a result of each allocated appliance that is to be configured with the network and the generated network-configuration random number.

In the operation S42, the network-configuration random number, which is sent from the appliance that has been configured with the network, is verified with the network-configuration random number, which is sent from the appliance that is to be configured with the network.

The cloud verifies the network-configuration random number, which is sent from the appliance that has been configured with the network, with the network-configuration random number, which is sent from the appliance that is to be configured with the network, to determine whether the appliance that has been configured with the network corresponds to the appliance that is to be configured with the network. That is, the clouds determines whether the appliance, which is to be configured with the network, is the appliance that is required by the user terminal, which corresponds to the appliance that has been configured with the network, to be configured with the network.

In the operation S43, in response to a successful verification, the appliance that is to be configured with the network is bound to the account number corresponding to the appliance that has been configured with the network.

Based on the above analysis, the appliance that has been configured with the network is bound to an account number (either the user's account number or an account number of the user terminal), such that the user or the user terminal may control the appliance that has been configured with the network. When the verification is successful, the appliance that is to be configured with the network is bound to the user account number corresponding to the appliance that has been configured with the network, enabling the user terminal to control the appliance that is to be configured with the network.

Further, after the network configuration is completed, the cloud prompts summary information of network configuration results to the user terminal, and the user terminal may present the summary information to the user via the APP.

In the present embodiment, the appliance that has already been configured with the network configures the network to the appliance, which is to be configured with the network and is allocated to the instant appliance that has already been configured with the network. In this way, network configuration may be performed for the plurality of appliances that are to be configured with the network simultaneously, improving the efficiency of network configuration for the appliances. In addition, in the present embodiment, the appliance that is to be configured with the network is allocated to the appliance that has been configured with the network, based on the environmental information of the appliance that has been configured with the network. In this way, the appliance that is to be configured with the network may be allocated appropriately to the corresponding appliance that has been configured with the network, further improving the efficiency of network configuration for the appliances that are to be configured with the network.

Figure 5:
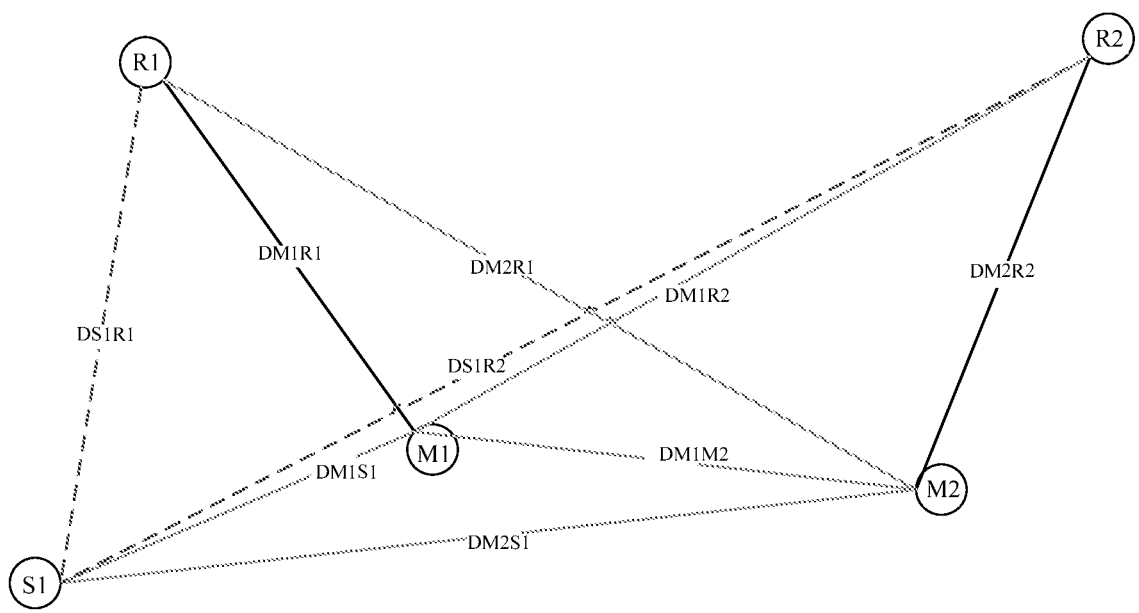
FIG. 5 is a schematic view of distribution of appliances configured with the network and network devices according to some embodiments of the present disclosure.

In an application scenario, as shown in FIG. 5, in the present embodiment, the at least two appliances that have been configured with the network include a first appliance M1 that has been configured with the network and a second appliance M2 that has been configured with the network. A network device connected to the first appliance M1 that has been configured with the network is a first network device R1, and a network device connected to the second appliance M2 that has been configured with the network is a second network device R2. That is, the first appliance M1 that has been configured with the network is connected to the network via the first network device R1, and the second appliance M2 that has been configured with the network is connected to the network via the second network device R2. The first appliance M1 that has been configured with the network and the second appliance M2 that has been configured with the network simultaneously scan to find an appliance S1 that is to be configured with the network.

Network configuration needs to be performed on the appliance S1 that is to be configured with the network. A network of the appliance S1 that is to be configured with the network always follows the appliance, which has been configured with the network and is allocated to the appliance S1. That is, when the appliance S1 that is to be configured with the network is configured to the network via the first appliance M1 that has been configured with the network, the appliance S1 that is to be configured with the network is connected to the first network device R1. When the appliance S1 that is to be configured with the network is configured to the network via the second appliance M2 that has been configured with the network, the appliance S1 that is to be configured with the network is connected to the second network device R2. The allocation needs to ensure that the appliance S1 that is to be configured with the network is connected to the network device located closer to the appliance S1.

Figure 6:
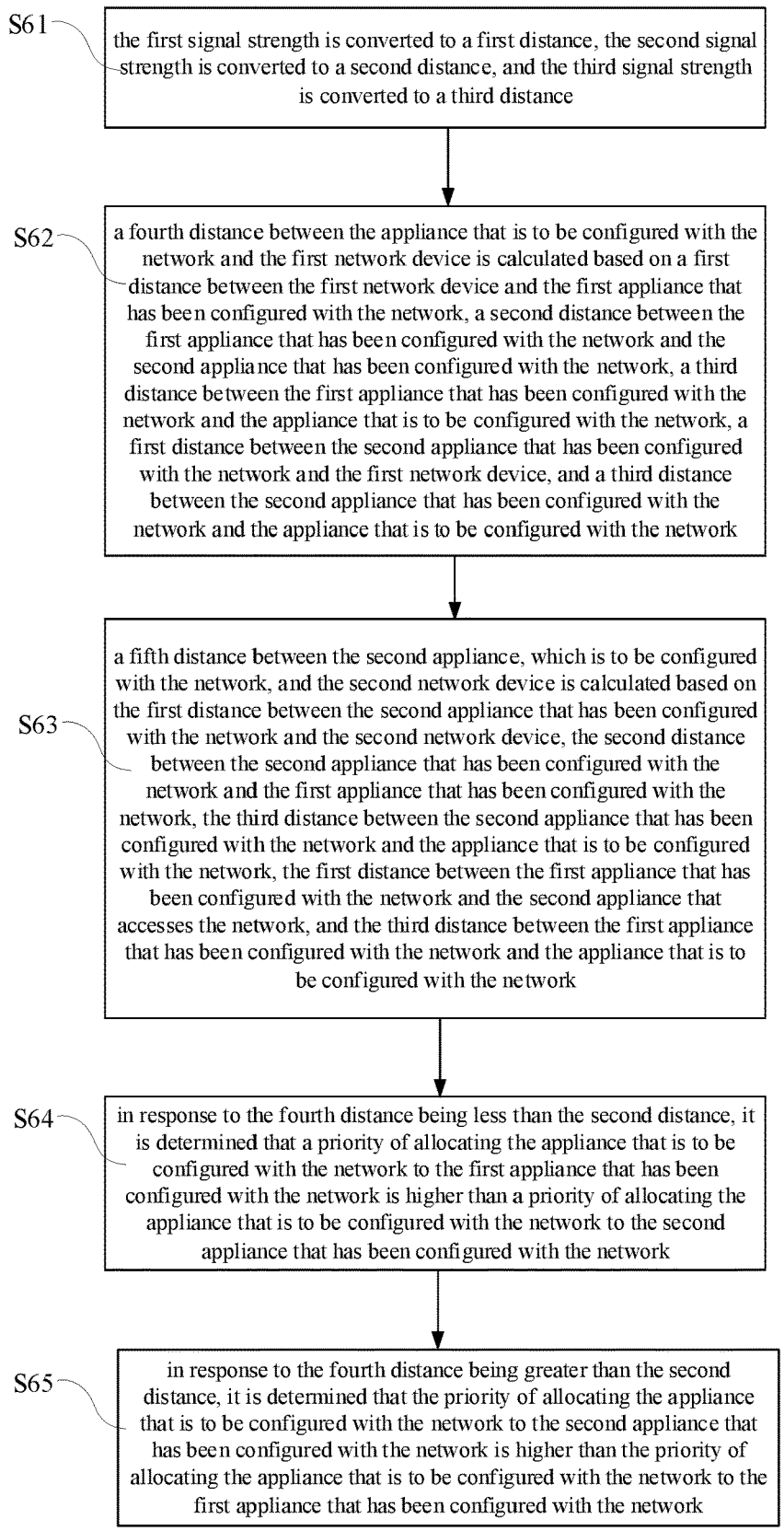
FIG. 6 is a flow chart of performing an operation S32 of the method shown in FIG. 3.

Alternatively, in some embodiments, the operation S32 may be achieved by performing the method as shown in FIG. 6. The method of the present embodiments includes operations S61 to S65.

In the operation S61, the first signal strength is converted to a first distance, the second signal strength is converted to a second distance, and the third signal strength is converted to a third distance.

The signal strength may reflect a distance between a signal sender and a signal receiver. Specifically, the distance between the signal sender and the signal receiver is $d=10^{(abs(rssi)-A)/10*n)}$, where the rssi is the signal strength, the A is signal strength when distance between the signal sender and the signal receiver is 1 meter, and the n is an environment attenuation factor.

The above signal strength may be converted into a corresponding distance based on the above equation.

In the operation S62, a fourth distance between the appliance that is to be configured with the network and the first network device is calculated based on a first distance between the first network device and the first appliance that has been configured with the network, a second distance between the first appliance that has been configured with the network and the second appliance that has been configured with the network, a third distance between the first appliance that has been configured with the network and the appliance that is to be configured with the network, a first distance between the second appliance that has been configured with the network and the first network device, and a third distance between the second appliance that has been configured with the network and the appliance that is to be configured with the network.

As shown in FIG. 5, based on the cosine theorem, the cloud obtains any angle between a triangle S1M1M2 and a triangle R1M1M2 based on the first distance DM1R1 between the first appliance M1 that has been configured with the network and the first network device R1, the third distance DM1S1 between the first appliance M1 that has been configured with the network and the appliance S1 that is to be configured with the network, the second distance DM1M2 between the first appliance M1 that has been configured with the network and the second appliance M2 that has been configured with the network, the first distance DM2R1 between the second appliance M2 that has been configured with the network and the first network device R1, and the third distance DM2S1 between the second appliance M2 that has been configured with the network and the appliance S1 that is to be configured with the network. Further, a supplementary angle for an angle between the third distance DM1S1 and the second distance DM1M2 and an angle between the second distance DM1M2 and the first distance DM1R1, such that an angle between the third distance DM1S1 and the first distance DM1R1 is obtained. Further, a distance DS1R1 is obtained based on an angle between the third distance DM1S1 and the first distance DM1R1, the third distance DM1S1, and the first distance DM1R1. The distance DS1R1 is the fourth distance DS1R1 between the appliance S1 that is to be configured with the network and the first network device R1.

In an operation S63, a fifth distance between the second appliance, which is to be configured with the network, and the second network device is calculated based on the first distance between the second appliance that has been configured with the network and the second network device, the second distance between the second appliance that has been configured with the network and the first appliance that has been configured with the network, the third distance between the second appliance that has been configured with the network and the appliance that is to be configured with the network, the first distance between the first appliance that has been configured with the network and the second appliance that accesses the network, and the third distance between the first appliance that has been configured with the network and the appliance that is to be configured with the network.

As shown in FIG. 5, based on the cosine theorem, the cloud obtains any angle between a triangle S1M1M2 and a triangle R2M1M2, based on the first distance DM2R2 between the second appliance M2 that has been configured with the network and the second network device R2, the third distance DM2S1 between the second appliance M2 that has been configured with the network and the appliance S1 that is to be configured with the network, the second distance DM1M2 between the first appliance M1 that has been configured with the network and the second appliance M2 that has been configured with the network, the first distance DM1R2 between the first appliance M1 that has been configured with the network and the second network device R2, and the third distance DM1S2 between the first appliance M1 that has been configured with the network and the appliance S1 that is to be configured with the network. Further, a supplementary angle for an angle between the third distance DM2S1 and the second distance DM1M2 and an angle between the second distance DM1M2 and the first distance DM2R2, such that an angle between the third distance DM2S1 and the first distance DM2R2 is obtained. Further, the fifth distance DS1R2 is obtained based on an angle between the third distance DM2S1 and the first distance DM2R2, the third distance DM2S1, and the first distance DM2R2. The distance DS1R2 is the fifth distance between the appliance S1 that is to be configured with the network and the second network device R2.

In the operation S64, in response to the fourth distance being less than the second distance, it is determined that a priority of allocating the appliance that is to be configured with the network to the first appliance that has been configured with the network is higher than a priority of allocating the appliance that is to be configured with the network to the second appliance that has been configured with the network.

When the fourth distance DS1R1 is less than the fifth distance DS1R2, that is, when the distance between the appliance S1 that is to be configured with the network and the first network device R1 is less than the distance between the appliance S1 that is to be configured with the network and the second network device R2, the cloud determines that a priority of allocating the appliance S1 that is to be configured with the network to the first appliance M1 that has been configured with the network is higher than a priority of allocating the appliance S1 that is to be configured with the network to the second appliance M2 that has been configured with the network. The cloud allocates the appliance S1 that is to be configured with the network to the first appliance M1 that has been configured with the network.

In the operation S65, in response to the fourth distance being greater than the second distance, it is determined that the priority of allocating the appliance that is to be configured with the network to the second appliance that has been configured with the network is higher than the priority of allocating the appliance that is to be configured with the network to the first appliance that has been configured with the network.

When the fourth distance DS1R1 is less than the fifth distance DS1R2, that is, when the distance between the appliance S1 that is to be configured with the network and the second network device R2 is less than the distance between the appliance S1 that is to be configured with the network and the first network device R1, the cloud determines that the priority of allocating the appliance S1 that is to be configured with the network to the second appliance M2 that has been configured with the network is higher than the priority of allocating the appliance S1 that is to be configured with the network to the first appliance M1 that has been configured with the network. The cloud allocates the appliance S1 that is to be configured with the network to the second appliance M2 that has been configured with the network.

When the fourth distance DS1R1 is equal to the fifth distance DS1R2, the appliance S1 that is to be configured with the network may be allocated to the one of the first appliance M1 that has been configured with the network and the second appliance M2 that has been configured with the network, and the allocated appliance has fewer allocated appliances that are to be configured with the network.

In other embodiments, the number of appliances that have been configured with the network may be greater than 2, or the number of appliances that is to be configured with the network may be greater than 1. In these cases, the priority of allocating the appliance that is to be configured with the network to the appliance that has been configured with the network may be determined by performing the method described above.

In other embodiments, the distances may be obtained by other means, such as by infrared rays.

Figure 7:
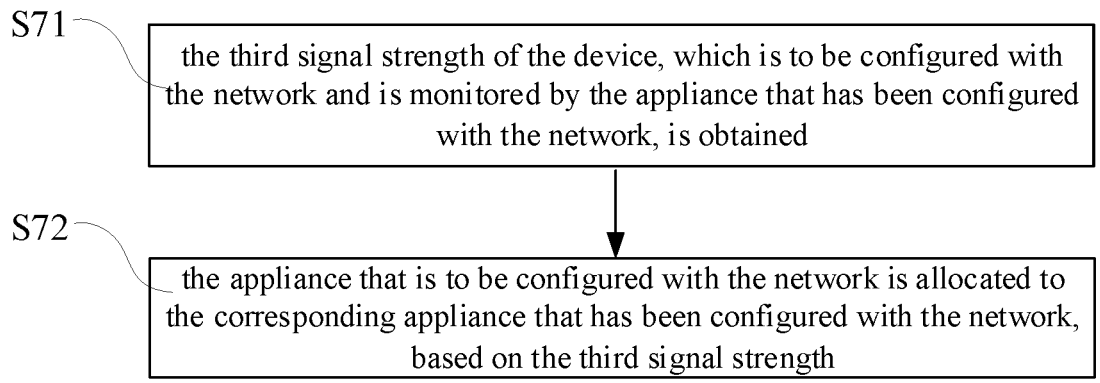
FIG. 7 is a flow chart of performing an operation S12 of the method shown in FIG. 1.

In another embodiment, at least two appliances that have been configured with the network are connected to one network device. That is, at least two appliances that have been configured with the network are connected to the network via the same network device. In this case, the operation S12 of the method may be achieved by performing the method shown in FIG. 7, the method of the present embodiments includes operations S71 to S73.

In an operation S71, the third signal strength of the device, which is to be configured with the network and is monitored by the appliance that has been configured with the network, is obtained.

Specifically, a third hotspot signal strength of the to-be-matched device monitored by each appliance that has been configured with the network is obtained.

The cloud may control the appliances that have been configured with the network to enter the mixed monitoring mode to monitor any wireless packet in the air to obtain the corresponding hotspot signal strength.

In the operation S72, the appliance that is to be configured with the network is allocated to the corresponding appliance that has been configured with the network, based on the third signal strength.

The cloud may determine the signal transmission distance between each appliance that has been configured with the network in the smart home system and the allocated appliance that is to be configured with the network, based on the third hotspot signal strength between at least two appliances that have been configured with the network and their correspondingly-allocated appliances that are to be configured with the network. Therefore, the cloud allocates, based on the above hotspot signal strength, the appliance that is to be configured with the network to the corresponding appliance that has been configured with the network, such that the network distribution may be performed more appropriately and more efficiently.

Figure 8:
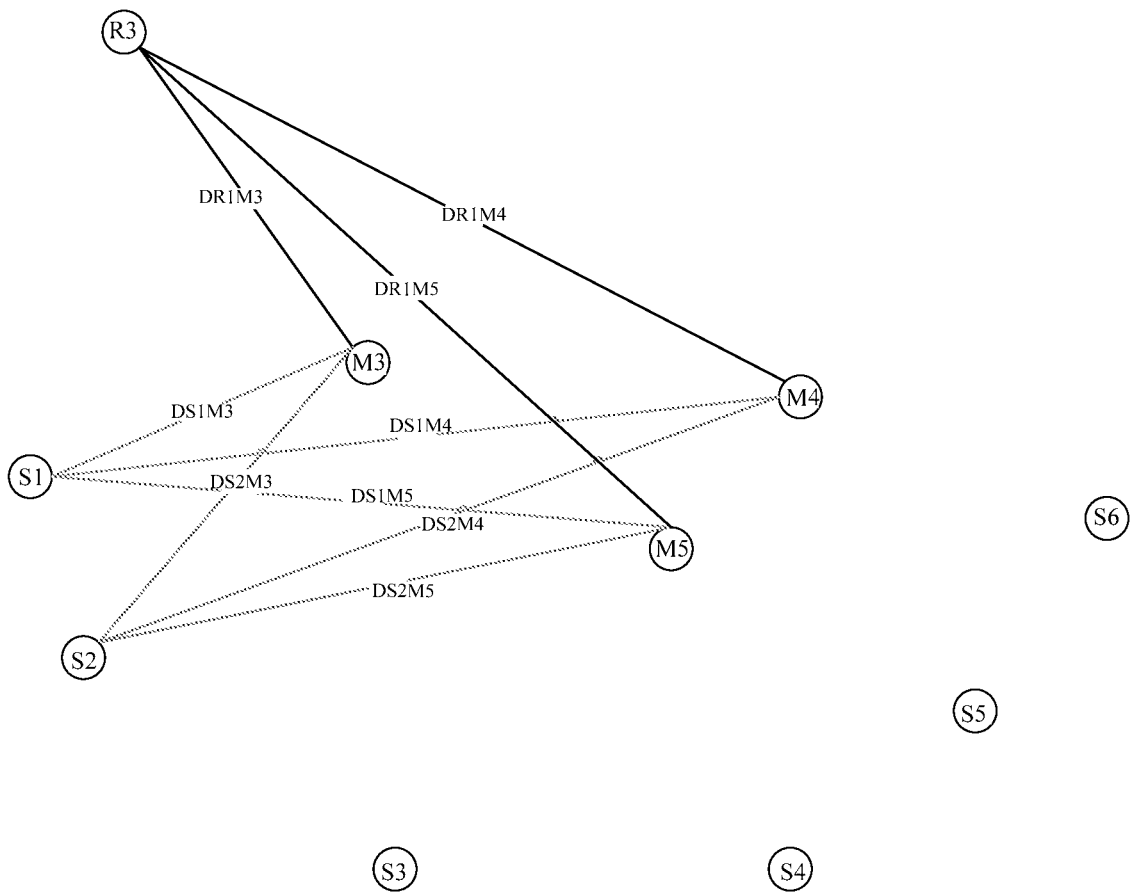
FIG. 8 is a schematic view of distribution of appliances configured with the network and network devices according to some embodiments of the present disclosure.

In an application scenario, as shown in FIG. 8, in the present embodiment, the at least two appliances that have been configured with the network include an appliance M3 that has been configured with the network, an appliance M4 that has been configured with the network, and an appliance M5 that has been configured with the network. Each of the appliance M3, the appliance M4, and the appliance M5 is connected to the network through a network device R3. The appliance M3 that has been configured with the network, the appliance M4 that has been configured with the network, and the appliance M5 that has been configured with the network simultaneously scan to find appliances S1-S6 that are to be configured with the network.

Network configuration needs to be performed on the appliances S1-S6 that are to be configured with the network. The allocation enables adjacent appliances that have been configured with the network to locate closer to the correspondingly-allocated appliances that are to be configured with the network. The network appliances S1-S6 that are to be configured with the network are allocated, as evenly as possible, to the appliances M3-M5 that have been configured with the network.

Figure 9:
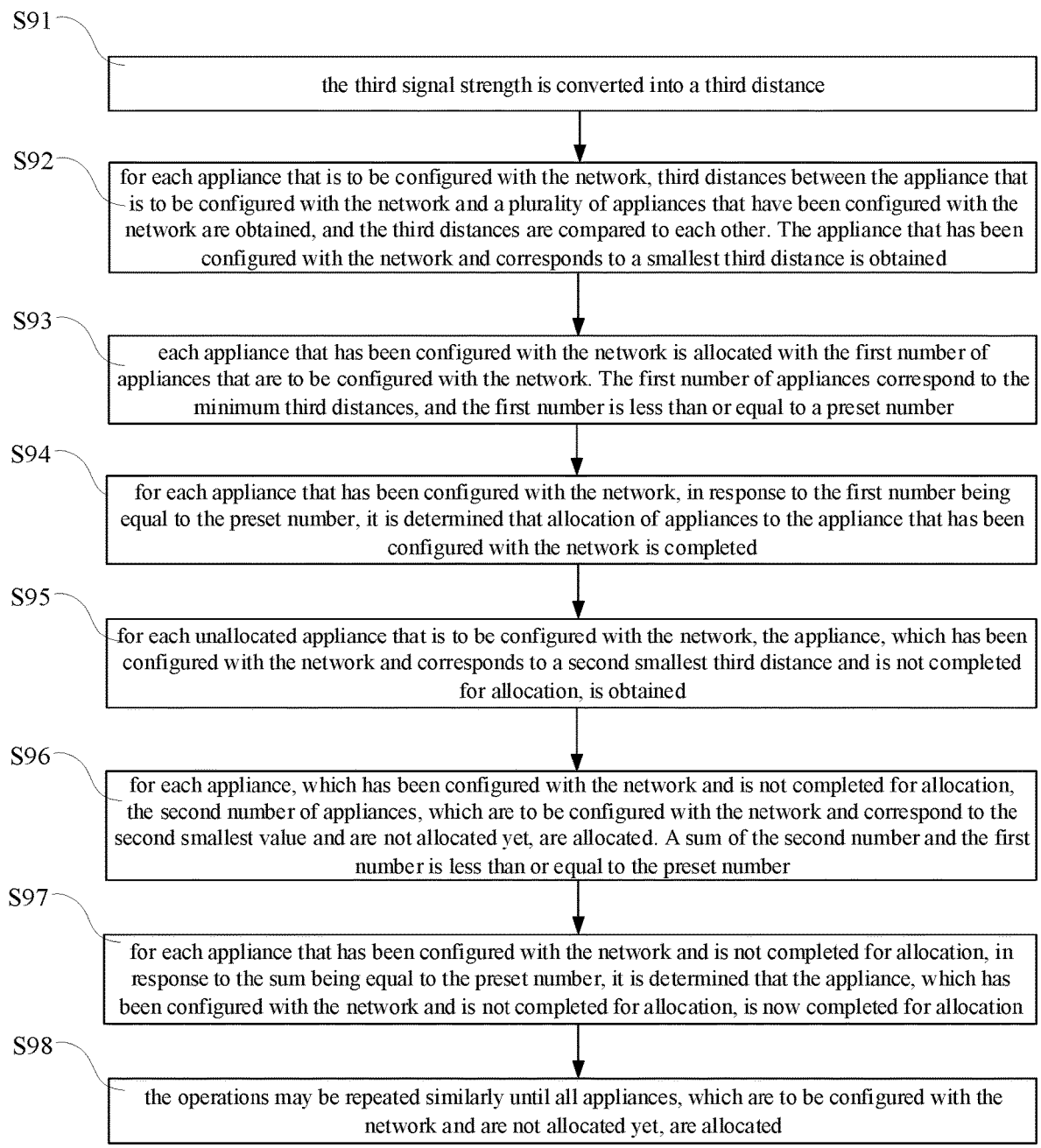
FIG. 9 is a flow chart of performing an operation S72 of the method shown in FIG. 7.

Alternatively, in the present embodiment, the operation S72 may be achieved by performing a method as shown in FIG. 9. The method of the present embodiments includes operations S91 to S95.

In an operation S91, the third signal strength is converted into a third distance.

The signal strength may reflect the distance between the signal sender and the signal receiver. Specifically, the distance between the signal sender and the signal receiver is $d=10^{(abs(rssi)-A)/10*n}$, where the rssi is the signal strength, the A is the signal strength when the distance between the signal sender and the signal receiver is 1 meter, and the n is the environmental attenuation factor.

The third signal strength may be converted into the third distance based on the above equation.

In the operation S92, for each appliance that is to be configured with the network, third distances between the appliance that is to be configured with the network and a plurality of appliances that have been configured with the network are obtained, and the third distances are compared to each other. The appliance that has been configured with the network and corresponds to a smallest third distance is obtained.

As shown in FIG. 8, for each appliance that is to be configured with the network, a third distance between the appliance that is to be configured with the network and the appliance M1 that has been configured with the network, a third distance between the appliance that is to be configured with the network and the appliance M2 that has been configured with the network, and a third distance between the appliance that is to be configured with the network and the appliance M3 that has been configured with the network, are obtained, and the obtained third distances are placed in an order from a greatest value to a lowest value, i.e., in ascending order. For example, a third distance DS1M1 between the appliance S1 that is to be configured with the network and the appliance M1 that has been configured with the network, a third distance DS1M2 between the appliance S1 that is to be configured with the network and the appliance M2 that has been configured with the network, and a third distance DS1M3 between the appliance S1 that is to be configured with the network and the appliance M3 that has been configured with the network, are placed in the ascending order. In another example, a third distance DS2M1 between the appliance S2 that is to be configured with the network and the appliance M1 that has been configured with the network, a third distance DS2M2 between the appliance S2 that is to be configured with the network and the appliance M2 that has been configured with the network, and a third distance DS2M3 between the appliance S2 that is to be configured with the network and the appliance M3 that has been configured with the network, are placed in the ascending order. For each appliance that is to be configured with the network, the appliances M1, M2 and M3 that have been configured with the network are arranged in the ascending order to obtain the following table.

| S1 | M1 | M3 | M2 |
| S2 | M1 | M3 | M2 |
| S3 | M1 | M2 | M3 |
| S4 | M3 | M2 | M1 |
| S5 | M3 | M2 | M1 |
| S6 | M2 | M3 | M1 |

Based on the above table, the appliances M1, M1, M1, M3, M3, and M2, which have been configured with the network and correspond to the minimum third distance (the second column of the above table), are obtained.

In the operation S93, each appliance that has been configured with the network is allocated with the first number of appliances that are to be configured with the network. The first number of appliances correspond to the minimum third distances, and the first number is less than or equal to a preset number.

The preset number is a rounded upward value of a ratio of the total number of appliances that are to be configured with the network to the total number of appliances that have been configured with the network. When the total number of appliances that are to be configured with the network is CS and the total number of appliances that have been configured with the network is CM, the preset number is CAV=CS/CM (rounded upwards if not divisible).

In the present embodiment, the preset number CAV is 2, and that is, each of the appliances M1, M2 and M3 that have been configured with the network is allocated with 2 appliances that are to be configured with the network.

Specifically, in the second column (minimum value) of the above table, 2 appliances S1 and S2, which are to be configured with the network and correspond to the appliance M1 that has been configured with the network, are allocated to the appliance M1 that has been configured with the network. 1 appliance S4, which is to be configured with the network and corresponds to the appliance M3 that has been configured with the network in the second column of the above table, is allocated to the appliance M3 that has been configured with the network. 1 appliance S6, which is to be configured with the network and corresponds to the appliance M2 that has been configured with the network in the second column of the above table, is allocated to the appliance M2 that has been configured with the network.

In other embodiments, in a current round of allocation, the first number of the appliances, which are to be configured with the network and are allocated to each appliance that has been configured with the network, is not limited, as long as the first number is less than or equal to the present number.

In the operation S94, for each appliance that has been configured with the network, in response to the first number being equal to the preset number, it is determined that allocation of appliances to the appliance that has been configured with the network is completed.

2 appliances S1 and S2 that are to be configured with the network are allocated to the appliance M1 that has been configured with the network, and the allocation is completed. However, allocation for the appliance M2 that has been configured with the network and the allocation for the appliance M3 that has been configured with the network are not completed, and allocation for the appliances M2 and M3 are continually performed.

In some embodiments, when the first number (such as 3) for an appliance (such as M1) that has been configured with the network is greater than the preset number, the appliances (such as S1, S2), which are to be configured with the network and are located closer to the appliance that has been configured with the network, may be selected based on a distance between the appliance that has been configured with the network and appliances, which are to be configured with the network and correspond to the minimum value of the appliance that has been configured with the network.

In the operation S95, for each unallocated appliance that is to be configured with the network, the appliance, which has been configured with the network and corresponds to a second smallest third distance and is not completed for allocation, is obtained.

The total number of appliances, which are to be configured with the network and are allocated to the appliance M2 that has been configured with the network, and the total number of appliances, which are to be configured with the network and are allocated to the appliance M3 that has been configured with the network, are both less than a threshold value 2, and a second round of allocation is performed.

In the operation S96, for each appliance, which has been configured with the network and is not completed for allocation, the second number of appliances, which are to be configured with the network and correspond to the second smallest value and are not allocated yet, are allocated. A sum of the second number and the first number is less than or equal to the preset number.

Specifically, one appliance S5, which is to be configured with the network and corresponds to the appliance M2 that has been configured with the network in the third column (the second smallest value) of the above table, is allocated to the appliance M2 that has been configured with the network.

In the operation S97, for each appliance that has been configured with the network and is not completed for allocation, in response to the sum being equal to the preset number, it is determined that the appliance, which has been configured with the network and is not completed for allocation, is now completed for allocation.

Two appliances S6 and S5, which are to be configured with the network, have been allocated to the appliance M2 that has been configured with the network, and the allocation for the appliance M2 is completed.

A same principle may be applied for each round of allocation to ensure the number of appliances, which are to be configured with the network and are allocated to each appliance that has been configured with the network, to be less than or equal to the preset number. When the number is less than the preset number, a next allocation is performed. When the number is equal to the preset number, the allocation is completed.

In the operation S98, the operations may be repeated similarly until all appliances, which are to be configured with the network and are not allocated yet, are allocated.

In the third round of allocation, one appliance S6, which is to be configured with the network and corresponds to the appliance M3 that has been configured with the network in the fourth column in the above table, is allocated to the appliance M3 that has been configured with the network. Two appliances S4 and S3, which are to be configured with the network, have been allocated to the appliance M3 that has been configured with the network. Allocation for the appliance M3 is completed.

For the above table, other allocation methods may be applied. For example, the first round of allocation can be performed based on the second column of the above table. The appliances S4 and S5, which are to be configured with the network, may be allocated to the appliances M3 that has been configured with the network. In this way, the second round of allocation may be performed based on the third column of the above table to allocate the appliance S3, which to be configured with the network, to the appliance M2 that has been configured with the network. The entire allocation is completed.

Figure 10:
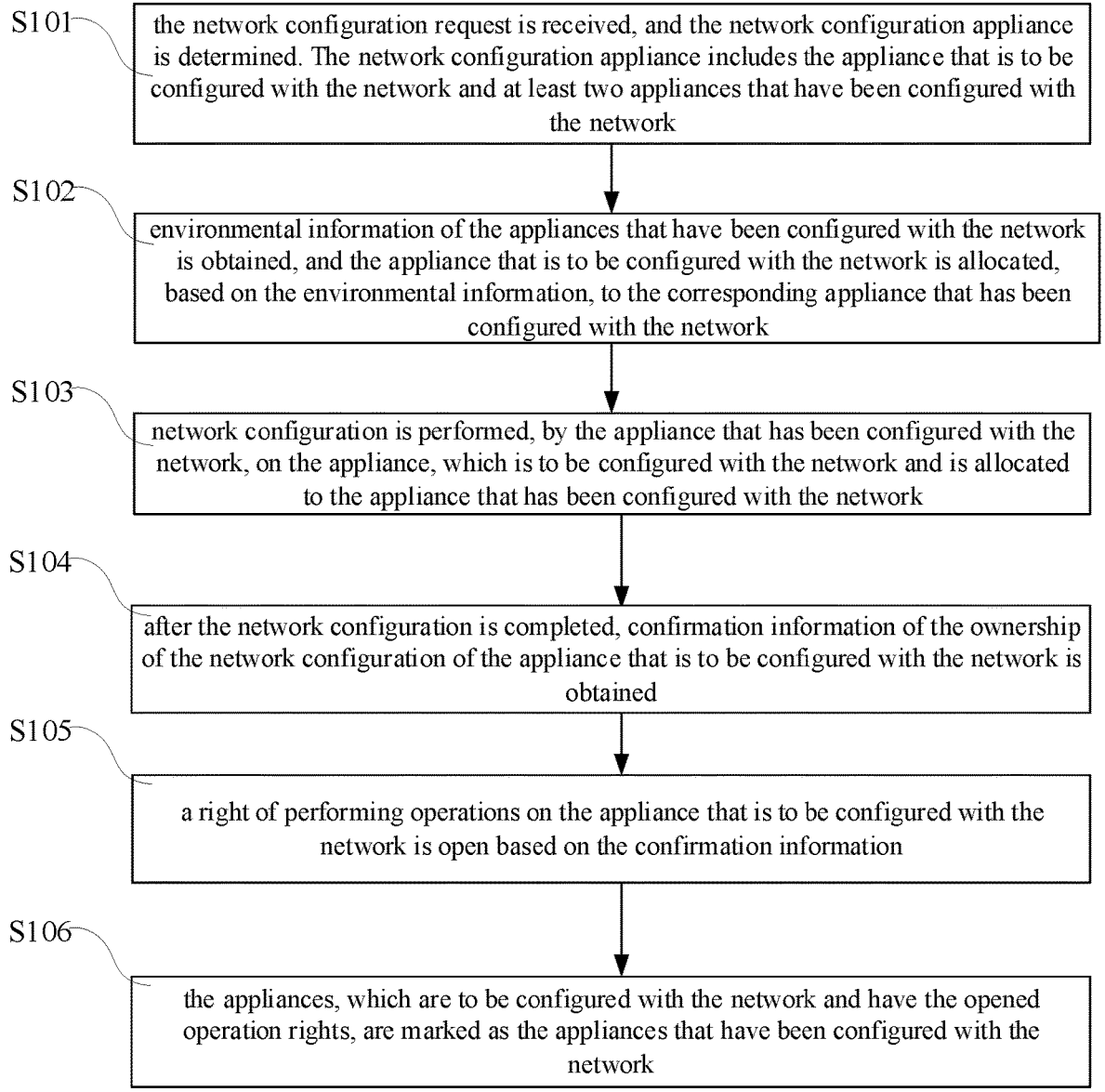
FIG. 10 is a flow chart of a method of network configuration for domestic appliances according to some embodiments of the present disclosure.

The present disclosure further provides the method of network configuration for domestic appliances according to another embodiments of the present disclosure, as shown in FIG. 10. FIG. 10 is a flow chart of the method of network configuration for domestic appliances according to some embodiments of the present disclosure. The method of network configuration for domestic appliances of the present embodiments includes the following operations.

In an operation S101, the network configuration request is received, and the network configuration appliance is determined. The network configuration appliance includes the appliance that is to be configured with the network and at least two appliances that have been configured with the network.

In an operation S102, environmental information of the appliances that have been configured with the network is obtained, and the appliance that is to be configured with the network is allocated, based on the environmental information, to the corresponding appliance that has been configured with the network.

In an operation S103, network configuration is performed, by the appliance that has been configured with the network, on the appliance, which is to be configured with the network and is allocated to the appliance that has been configured with the network.

The operations S101 to S103 are similar to the operations S11 to S13 in the above and will not be repeated here.

In the operation S104, after the network configuration is completed, confirmation information of the ownership of the network configuration of the appliance that is to be configured with the network is obtained.

After all appliances that have been configured with the network complete network configuration, the cloud feeds the network configuration results back to the user terminal, and the network configuration results are presented to the user via the APP. The user may complete confirmation of the ownership of the appliance that is to be configured with the network via physical buttons and may upload confirmation information of the ownership of network configuration to the cloud.

In the operation S105, a right of performing operations on the appliance that is to be configured with the network is open based on the confirmation information.

The cloud terminal opens, based on the confirmation information, the right of performing operations to allow the user terminal to perform operations on the appliance that is to be configured with the network. Only when all functions of the appliance that is to be configured with the network are activated, information of the appliance that is to be configured with the network in the current network configuration may be controlled in the APP. In this way, it is ensured that the appliance that is to be configured with the network may not be controlled by other users or other user terminals.

In order to maximize the effect of performing network distribution in batch, the appliances that are to be configured with the network need to be in a configurable state for a long time after being powered up, such that the appliances that are to be configured with the network may be easily discovered by the appliance that has been configured with the network and may access the network through the shared information of the appliance that has been configured with the network. In this case, when the ownership of the network configuration is not confirmed, a security issue may be caused.

In an operation S106, the appliances, which are to be configured with the network and have the opened operation rights, are marked as the appliances that have been configured with the network.

The cloud marks the appliances that have the opened operation rights as the appliances that have been configured with the network. Therefore, while performing network configuration in batch in a next time, the marked appliances that have been configured with the network may serve as new appliances that have been configured with the network.

The appliance, which is to be configured with the network and has an unconfirmed ownership, is prohibited from participating in the network configuration, preventing a range of network configuration from being expanded indefinitely.

Figure 11:
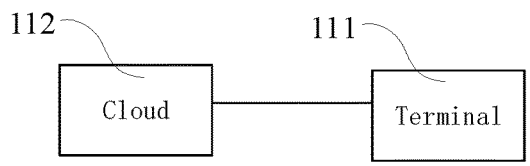
FIG. 11 is a structural schematic view of a system of network configuration for domestic appliances according to some embodiments of the present disclosure.

The present disclosure further provides a system of network configuration for domestic appliances, as shown in FIG. 11. FIG. 11 is a structural schematic view of a system of network configuration for domestic appliances according to some embodiments of the present disclosure. The network configuration system in the present embodiments includes a terminal 111 and a cloud 112 communicatively connected to the terminal 111. The terminal 111 is configured to generate the network configuration request. The cloud 112 is configured to receive the network configuration request and determine the plurality of network configuration appliances. The plurality of network configuration appliances include the appliance that is to be configured with the network and at least two appliances that have been configured with the network. The cloud 112 is further configured to obtain the environmental information of the appliances that have been configured with the network and to allocate, based on the environmental information, the appliance that is to be configured with the network to the corresponding appliance that has been configured with the network. The cloud 112 is further configured to take the appliance that has been configured with the network to perform network configuration on the appliance, which is to be configured with the network and is allocated to the appliance that has been configured with the network.

The cloud 112 may be a stand-alone physical server or a cloud server or may be integrated within an appliance that has been configured with the network. The terminal may be a mobile terminal or other electronic devices.

Figure 12:
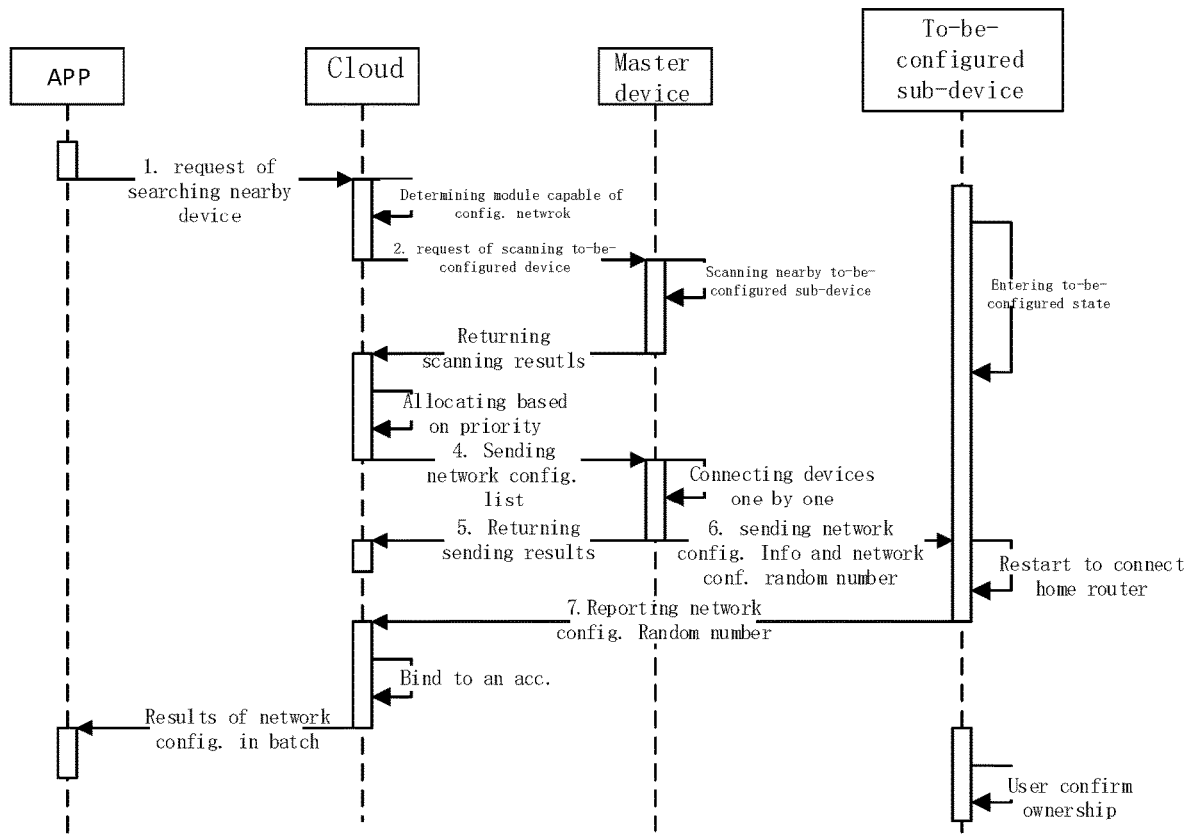
FIG. 12 is a schematic view of information interaction of the embodiments shown in FIG. 11.

In an application scenario, as shown in FIG. 12, the user initiates, via the APP of the terminal 111, a request (the above-mentioned network configuration request) to search a device, which is to be configured with the network and is located near the user. The cloud 112 receives the network configuration request and searches a device (a master device, i.e., the above-mentioned appliance that has been configured with the network), which is bound to the user's account and has the capability of performing network configuration for a plurality of devices in batch. Further, the could 112 sends the master device a request of scanning for devices that are to be configured with the network. The device, which has accessed the network and has the capability of performing network configuration for a plurality of devices in batch, is referred to as the master device in the present embodiment. The master device receives the request from the cloud 112 and may scan nearby hotspots by radio to find any sub-device (the above-mentioned appliances that are to be configured with the network), which is to be configured with the network and is located near the master device. The sub-device may be a device that carries prefixes of a series of hotspot names or a device whose broadcast beacon carries specific manufacturer information. The master device may uploads signal strength of a home router connected to the master device, signal strength of each sub-device, which is to be configured with the network and is scanned by the master device, and hotspot information of each sub-device that is to be configured with the network, to the cloud 112. The cloud 112 receives scanning results reported by a plurality of master devices and calculates the priority as described in the above network configuration method to perform allocation (of course, the allocation may alternatively be performed by following the method in FIG. 7 to FIG. 9) based on the signal strength of each sub-device that is to be configured with the network. The cloud 112 sends allocation results to each master device through a list. The plurality of master devices start to perform network configuration on sub-devices, which are to be configured with the network and are located near the respective one of master devices, in parallel. Firstly, each master device connects to the hotspot of each sub-device that is to be configured with the network. The master device generates the network-configuration random number and sends the home router information recorded by the master device and the network-configuration random number to the sub-device that is to be configured with the network. The master device distributes the network configuration information to the allocated list one by one. When the distribution is completed, the master device feeds the network configuration results of each sub-device that is to be configured with the network and the generated network-configuration random number back to the cloud 112. When the sub-device that is to be configured with the network successfully logs in, the obtained network-configuration random number of the network is reported to cloud 112. The cloud 112 verifies the network-configuration random number reported by the sub-device with the network-configuration random number reported by the master device. When the two numbers are consistent with each other, the cloud 112 binds the sub-device, which accesses the network and is to be configured with the network, to the same account of the master device. Finally, when all the master devices complete the network configuration, the cloud 112 summarizes the network configuration results and feeds the network configuration results back to the terminal 111, and the network configuration results are presented to the user through the APP. At last, only when the user confirms, in the APP through the physical button, the ownership of network configuration of the sub-device that is to be configured with the network, the user may control the sub-device that is to be configured with the network in the APP. In addition, when a sub-device (confirmed ownership), which is to be configured with the network and has accesses the network, has the capability of performing network configuration on multiple devices in batch, the sub-device may be served as a new master device for performing network configuration on multiple devices in batch in a next time. The sub-device, which is to be configured with the network but has unconfirmed ownership, is prohibited from participating network configuration, preventing a range of network configuration from being expanded indefinitely.

The master device scans to find specific sub-devices that are to be configured with the network, and the user may tick to select, on the APP, specific sub-devices that need to be configured with the network from all found sub-devices. In this way, the user may have a better usage experience. The method of taking the cloud to allocate the list of sub-devices that are to be configured with the network allows the plurality of master devices to work at the same time, improving the efficiency of network configuration.

The device that is not configured with the network, after being powered up, is in the state of pending to be configured with the network for a long time. In this way, a usage rate of network configuration in batch may be maximized. Ownership of the devices, which access the network through the network configuration in batch, needs to be confirmed by a physical button, ensuring the devices to be used safely.

The cloud 112 is further configured to achieve the above network configuration methods, which will not be repeated here.

In the present embodiment, the appliance that has been configured with the network performs network configuration on the appliance, which is to be configured with the network and is allocated to the appliance that has been configured with the network. In this way, network configuration may be performed simultaneously on a plurality of appliances that are to be configured with the network in batch. The efficiency of performing network configuration on the appliances that are to be configured with the network may be improved. In addition, in the present embodiment, the appliances that are to be configured with the network are allocated to the appliance that has been configured with the network, based on the environmental information of the appliance that has been configured with the network. In this way, the appliances that are to be configured with the network are ensured to be appropriately allocated to the corresponding appliance that has been configured with the network, further improving the efficiency of performing network configuration on the appliances that are to be configured with the network.

Figure 13:
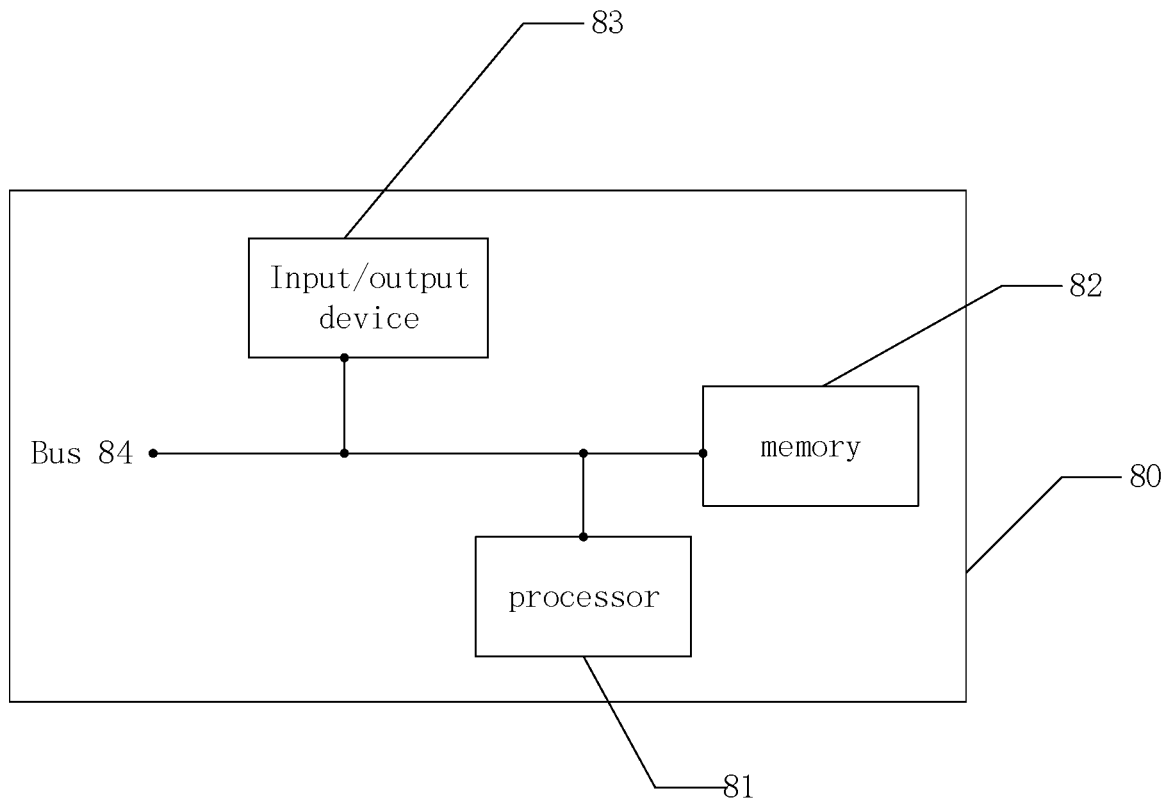
FIG. 13 is a structural schematic view of an electronic device according to some embodiments of the present disclosure.

The present disclosure further provides an electronic device, as shown in FIG. 13. FIG. 13 is a structural schematic view of an electronic device according to some embodiments of the present disclosure. The electronic device 80 of the present embodiments includes a processor 81, a memory 82, an input and output device 83, and a bus 84.

Each of the processor 81, the memory 82, and the input and output device 83 is connected to the bus 84. The memory 82 stores program data, and the processor 81 is configured to execute the program data in order to perform the above-mentioned network configuration method.

In the present embodiment, the processor 81 may alternatively be referred to as a central processing unit (CPU). The processor 81 may be an integrated circuit chip having a capability of processing signals. The processor 81 may alternatively be a general purpose processor, a digital signal processor (DSP), an application specific integrated circuit (ASIC), a field programmable gate array (FPGA) or other programmable logic devices, a discrete gate or transistor logic device, a discrete hardware component. The general purpose processor may be a microprocessor, or the processor 81 may alternatively be any conventional processor, and so on.

Figure 14:
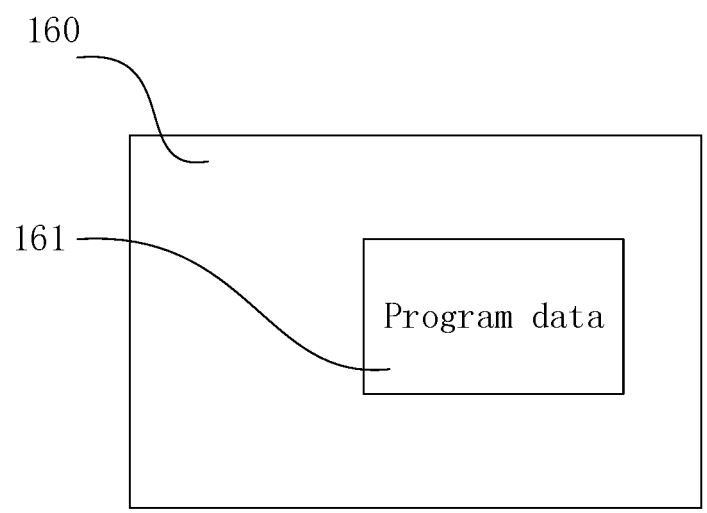
FIG. 14 is a structural schematic view of a computer storage medium according to some embodiments of the present disclosure.

The present disclosure further provides a computer readable storage medium, as shown in FIG. 14. In the present embodiment, the computer readable storage medium 160 is configured to store the program data 161 of the above embodiment. The program data 161 may be capable of being executed to perform the above method of network configuration. The program data 161 has been described in detail in the method embodiments as described in the above and will not be repeated here.

In the present embodiment, the computer readable storage medium 160 may be, but is not limited to, a USB flash drive, a SD card, a PD optical drive, a removable hard drive, a high capacity floppy drive, a flash memory, a multimedia memory card, a server, and the so on.

According to the present disclosure, the method of network configuration for domestic appliances is provided. For the method, firstly, an appliance to be configured with the network and an appliance that has been configured with the network are determined. Subsequently, the appliance to be configured with the network may be allocated, based on environmental information of the appliance that has been configured with the network, to a corresponding appliance that has been configured with the network. Finally, the appliance that has been configured with the network may be taken to configure the network for the appliance, which is to be configured with the network and is allocated to the appliance that has been configured with the network. In this way, in the present disclosure, since the appliance that has been configured with the network is taken to configure the network for the appliance, which is to be configured with the network and is allocated to the appliance that has been configured with the network, a plurality of appliances that are to be configured with the network may be configured with the network simultaneously in a batch, such that the efficiency of network configuration for the appliances that are to be configured with the network may be improved. In addition, in the present disclosure, the appliance to be configured with the network may be allocated, based on environmental information of the appliance that has been configured with the network, to the appliance that has been configured with the network. In this way, the appliances that are to be configured with the network may be properly allocated to the corresponding appliance that has been configured with the network, further improving the efficiency of network configuration for the appliance that is to be configured with the network.

In addition, the above functions, when being implemented as software functions and sold or used as a stand-alone product, may be stored in a mobile terminal readable storage medium. That is, the present disclosure further provides a storage device storing program data that can be executed to implement the methods of the above embodiments. The storage device may be, for example, a USB disk, an optical disk, a server, and so on. In other words, the present disclosure can be embodied in the form of a software product including a number of instructions to enable an intelligent terminal to perform all or some of the operations of the method described in each embodiment.

In the description of the present disclosure, the terms "an embodiment", "some embodiments", "example", "specific example", or "some examples" mean that specific features, mechanisms, materials or properties described in the embodiment or the example are included in at least one embodiment or example of the present disclosure. In the specification, schematic expressions of the above terms do not have to refer to a same embodiment or a same example. Furthermore, the described specific features, mechanisms, materials or properties may be combined in a suitable manner in any one or more of the embodiments or examples. Furthermore, without contradicting each other, any ordinary skilled person in the art may combine different embodiments or examples described in the specification or combine features of different embodiments or examples.

Furthermore, the terms "first" and "second" are used for descriptive purposes only and shall not be understood as indicating or implying relative importance or implicitly specifying the number of indicated technical features. Therefore, a feature qualified with the "first" and the "second" may explicitly or implicitly include at least one such feature. In the description of the present disclosure, "a plurality of" means at least two, such as two, three, and so on, unless otherwise expressly and specifically limited.

Any process or method in the flowchart or described otherwise herein may be interpreted as representing bodies, fragments or portions of code including one or more executable instructions for implementing operations of a particular logical function or process. The scope of the preferred embodiment of the present disclosure includes other implementations. In the other implementations, the functions may be performed in a substantially simultaneous manner or in a reversed order, depending on the functions involved. The order of the operations shall be understood by any ordinary skilled person in the art to which the embodiments of the present disclosure belong.

The logic and/or operations represented in the flow chart or otherwise described herein, for example, may be considered to be a sequential list of executable instructions for implementing logical functions that may be specifically implemented in any computer-readable medium for use by or in conjunction with an instruction execution system, a device or an apparatus (which may be a personal computer, a server, a network device or other systems that can take instructions from and execute instructions from the instruction execution system, the device or the apparatus). For the present specification, a "computer readable medium" may be any device that can contain, store, communicate, propagate or transmit a program for use in or in conjunction with the instruction execution system, the device or the apparatus. More specific examples of computer readable media (a non-exhaustive list) include the following: electrically connected sections having one or more wiring (electronic devices), portable computer disk cartridges (magnetic devices), random access memory (RAM), read-only memory (ROM), erasable editable read-only memory (EPROM or flash memory), fiber optic devices, and portable compact disc read-only memory (CDROM). In addition, the computer readable medium may even be a paper or other suitable medium on which the programs can be printed, since the programs can be obtained electronically, for example by being optically scanned, followed by being edited, decoded, or, if necessary, being processed in other suitable ways, and then stored in the computer memory.

The foregoing shows only an embodiment of the present disclosure and is not intended to limit the scope of present disclosure. Any equivalent mechanism or equivalent process transformation performed based on the specification and the accompanying drawings of the present disclosure, applied directly or indirectly in other related fields, shall be equally covered by the scope of the present disclosure.

What is claimed is:

1. A method of performing network configuration on domestic appliances, comprising:
   receiving a network configuration request and determining a plurality of network configuration appliances, wherein the plurality of network configuration appliances comprise an appliance that is to be configured with a network and at least two appliances that have been configured with the network;
   obtaining environmental information of the appliances that have been configured with the network, allocating, based on the environmental information, the appliance that is to be configured with the network to a corresponding one of the at least two appliances that have been configured with the network; and
   performing network configuration on the appliance to be configured with the network based on a corresponding appliance that has been configured with the network and is allocated to the corresponding appliance;
   wherein a network device connected to one of the at least two appliances that have been configured with the network is different from a network device connected to another one of the at least two appliances that have been configured with the network or the at least two appliances that have been configured with the network are connected to one network device; and
   wherein obtaining environmental information of the appliances that have been configured with the network, allocating, based on the environmental information, the appliance that is to be configured with the network to a corresponding one of the at least two appliances that have been configured with the network, comprises:
   in accordance with a determination that the network device connected to one of the at least two appliances that have been configured with the network is different from the network device connected to another one of the at least two appliances that have been configured with the network:
   for one of the at least two appliances that have been configured with the network, obtaining first signal strength of the network device monitored by the appliance that has been configured with the network, second signal strength of the rest of the at least two appliances that have been configured with the network, and third signal strength of the appliance that is to be configured with the network;
   for one of the at least two appliances that have been configured with the network, determining, based on the first signal strength, the second signal strength, and the third signal strength, a priority of allocating the appliance, which is to be configured with the network the appliance, to the appliance, which has been configured with the network; and
   allocating, based on the priority, the appliance, which is to be configured with the network, to the corresponding one of the at least two appliances that have been configured with the network; and wherein the environmental information comprises signal strength, and
   in accordance with a determination that the at least two appliances that have been configured with the network are connected to one network device:
   obtaining third signal strength of the appliance, which is to be configured with the network and is monitored by one of the at least two appliances that have been configured with the network, is obtained; and
   allocating, based on the third signal strength, the appliance that is to be configured with the network to the corresponding one of the at least two appliances that have been configured with the network.

2. The method according to claim 1, wherein,
   the at least two appliances that have been configured with the network comprise a first appliance that has been configured with the network and a second appliance that has been configured with the network;
   the network device connected to the first appliance that has been configured with the network is a first network device, and the network device connected to the second appliance that has been configured with the network is a second network device; and
   the determining, based on the first signal strength, the second signal strength, and the third signal strength, a priority of allocating the appliance, which is to be configured with the network the appliance, to the appliance, which has been configured with the network, comprises:
   converting the first signal strength to a first distance, converting the second signal strength to a second distance, and converting the third signal strength to a third distance;
   calculating a fourth distance between the appliance that is to be configured with the network and the first network device based on a first distance between the first network device and the first appliance that has been configured with the network, a second distance between the first appliance that has been configured with the network and the second appliance that has been configured with the network, a third distance between the first appliance that has been configured with the network and the appliance that is to be configured with the network, a first distance between the second appliance that has been configured with the network and the first network device, and a third distance between the second appliance that has been configured with the network and the appliance that is to be configured with the network;

calculating a fifth distance between the second appliance, which is to be configured with the network, and the second network device based on a first distance between the second appliance that has been configured with the network and the second network device, the second distance between the second appliance that has been configured with the network and the first appliance that has been configured with the network, the third distance between the second appliance that has been configured with the network and the appliance that is to be configured with the network, a first distance between the first appliance that has been configured with the network and the second network device, and the third distance between the first appliance that has been configured with the network and the appliance that is to be configured with the network;

in response to the fourth distance being less than the second distance, determining that a priority of allocating the appliance that is to be configured with the network to the first appliance that has been configured with the network is higher than a priority of allocating the appliance that is to be configured with the network to the second appliance that has been configured with the network; and in response to the fourth distance being greater than the second distance, determining that the priority of allocating the appliance that is to be configured with the network to the second appliance that has been configured with the network is higher than the priority of allocating the appliance that is to be configured with the network to the first appliance that has been configured with the network.

3. The method according to claim 1, wherein the allocating, based on the third signal strength, the appliance that is to be configured with the network to the corresponding one of the at least two appliances that have been configured with the network, comprises:

converting the third signal strength into a third distance;

for each appliance that is to be configured with the network, obtaining third distances between the appliance that is to be configured with the network and the at least two appliances that have been configured with the network are obtained, comparing the obtained third distances to each other, and obtaining an appliance, which has been configured with the network and corresponds to a smallest third distance of all obtained third distances;

for each of the at least two appliances that have been configured with the network, allocating a first number of appliances that are to be configured with the network, wherein the first number of appliances correspond to the smallest third distance, and the first number is less than or equal to a preset number;

for each of the at least two appliances that have been configured with the network, in response to the first number being equal to the preset number, determining that allocation of appliances to the appliance that has been configured with the network is completed;

for each unallocated appliance that is to be configured with the network, obtaining the appliance, which has been configured with the network and corresponds to a second smallest third distance of all obtained third distances and is not completed for appliance allocation;

for each appliance, which has been configured with the network and is not completed for appliance allocation, allocating a second number of appliances, which are to be configured with the network and correspond to the second smallest third distance and are not allocated yet, wherein a sum of the second number and the first number is less than or equal to the preset number;

for each appliance, which has been configured with the network and is not completed for appliance allocation, in response to the sum being equal to the preset number, determining that the appliance, which has been configured with the network and is not completed for appliance allocation, is now completed for appliance allocation;

allocating all appliances, which are to be configured with the network;

wherein the preset number is a rounded upward value of a ratio of a total number of appliances that are to be configured with the network to the total number of appliances that have been configured with the network.

4. The method according to claim 1, further comprising:

obtaining confirmation information of ownership of network configuration of the appliance that is to be configured with the network, after the network configuration is completed; and opening, based on the confirmation information, a right of performing operations on the appliance that is to be configured with the network.

5. The method according to claim 1, wherein performing the network configuration on the appliance to be configured with the network comprises:

sending the network configuration request and device information of the appliance, which is to be configured with the network and is allocated, to the corresponding appliance that has been configured with the network, enabling the corresponding appliance that has been configured with the network to be connected to the appliance, which is allocated to the corresponding appliance and is to be configured with the network, based on the network configuration request;

verifying a network-configuration random number, which is sent from the appliance that has been configured with the network, with a network-configuration random number, which is sent from the appliance that is to be configured with the network; and in response to the verification being successful, binding the appliance that is to be configured with the network to an account corresponding to the appliance that has been configured with the network.

6. The method according to claim 1, wherein receiving a network configuration request and determining the plurality of network configuration appliances comprises:

receiving the network configuration request and obtaining an appliance, which has been configured with the network and has a capability to configure a network;

sending the network configuration request to the appliance, which has been configured with the network, to enable the appliance, which has been configured with the network, to obtain any appliance, which is to be configured with the network and is located within a network configuration range of the appliance that has been configured with the network; and prompting the obtained appliance that is to be configured with the network to a user, determining an appliance, which is to be configured with the network and is selected by the user from the prompted appliance, as an appliance that is to be configured with the network for current network configuration.

7. A system of network configuration for domestic appliances, comprising:
- a terminal, configured to generate a network configuration request;
- a cloud, communicatively connected to the terminal and configured to receive the network configuration request and determine a plurality of network configuration appliances, wherein the plurality of network configuration appliances comprise an appliance that is to be configured with a network and at least two appliances that have been configured with the network, and
- wherein the cloud is further configured to: obtain environmental information of the appliances that have been configured with the network; allocate, based on the environmental information, the appliance that is to be configured with the network to a corresponding one of the at least two appliances that have been configured with the network; and take a corresponding appliance that has been configured with the network to perform network configuration on the appliance, which is to be configured with the network and is allocated to the corresponding appliance that has been configured with the network,
- wherein a network device connected to one of the at least two appliances that have been configured with the network is different from a network device connected to another one of the at least two appliances that have been configured with the network or the at least two appliances that have been configured with the network are connected to one network device; and
- wherein the cloud is configured to perform operations of:
  obtaining environmental information of the appliances that have been configured with the network, allocating, based on the environmental information, the appliance that is to be configured with the network to a corresponding one of the at least two appliances that have been configured with the network, comprises:
  in accordance with a determination that the network device connected to one of the at least two appliances that have been configured with the network is different from the network device connected to another one of the at least two appliances that have been configured with the network:
   for one of the at least two appliances that have been configured with the network, obtaining first signal strength of the network device monitored by the appliance that has been configured with the network, second signal strength of the rest of the at least two appliances that have been configured with the network, and third signal strength of the appliance that is to be configured with the network;
   for one of the at least two appliances that have been configured with the network, determining, based on the first signal strength, the second signal strength, and the third signal strength, a priority of allocating the appliance, which is to be configured with the network the appliance, to the appliance, which has been configured with the network; and
   allocating, based on the priority, the appliance, which is to be configured with the network, to the corresponding one of the at least two appliances that have been configured with the network; and wherein the environmental information comprises signal strength, and
  in accordance with a determination that the at least two appliances that have been configured with the network are connected to one network device:
   obtaining third signal strength of the appliance, which is to be configured with the network and is monitored by one of the at least two appliances that have been configured with the network, is obtained; and
   allocating, based on the third signal strength, the appliance that is to be configured with the network to the corresponding one of the at least two appliances that have been configured with the network.

8. The system according to claim 7, wherein the at least two appliances that have been configured with the network comprise a first appliance that has been configured with the network and a second appliance that has been configured with the network;
- the network device connected to the first appliance that has been configured with the network is a first network device, and the network device connected to the second appliance that has been configured with the network is a second network device; and
- while determining, based on the first signal strength, the second signal strength, and the third signal strength, a priority of allocating the appliance, which is to be configured with the network the appliance, to the appliance, which has been configured with the network, the cloud is configured to perform operations of:
- converting the first signal strength to a first distance, converting the second signal strength to a second distance, and converting the third signal strength to a third distance;
- calculating a fourth distance between the appliance that is to be configured with the network and the first network device based on a first distance between the first network device and the first appliance that has been configured with the network, a second distance between the first appliance that has been configured with the network and the second appliance that has been configured with the network, a third distance between the first appliance that has been configured with the network and the appliance that is to be configured with the network, a first distance between the second appliance that has been configured with the network and the first network device, and a third distance between the second appliance that has been configured with the network and the appliance that is to be configured with the network;
- calculating a fifth distance between the second appliance, which is to be configured with the network, and the second network device based on a first distance between the second appliance that has been configured with the network and the second network device, the second distance between the second appliance that has been configured with the network and the first appliance that has been configured with the network, the third distance between the second appliance that has been configured with the network and the appliance that is to be configured with the network, a first distance between the first appliance that has been configured with the network and the second network device, and the third distance between the first appliance that has been configured with the network and the appliance that is to be configured with the network;
- in response to the fourth distance being less than the second distance, determining that a priority of allocating the appliance that is to be configured with the network to the first appliance that has been configured with the network is higher than a priority of allocating the appliance that is to be configured with the network to the second appliance that has been configured with the network; and in response to the fourth distance being greater than the second distance, determining that the priority of allocating the appliance that is to be configured with the network to the second appliance that has been configured with the network is higher than the priority of allocating the appliance that is to be configured with the network to the first appliance that has been configured with the network.

9. An electronic device, comprising a processor and a memory coupled to the processor, wherein the processor is configured to execute program data stored in the memory to perform operations of:

receiving a network configuration request and determining a plurality of network configuration appliances, wherein the plurality of network configuration appliances comprise an appliance that is to be configured with a network and at least two appliances that have been configured with the network;

obtaining environmental information of the appliances that have been configured with the network, allocating, based on the environmental information, the appliance that is to be configured with the network to a corresponding one of the at least two appliances that have been configured with the network;

performing network configuration on the appliance to be configured with the network based on a corresponding appliance that has been configured with the network and is allocated to the corresponding appliance, wherein a network device connected to one of the at least two appliances that have been configured with the network is different from a network device connected to another one of the at least two appliances that have been configured with the network or the at least two appliances that have been configured with the network are connected to one network device; and wherein the processor is configured to perform operations of: obtaining environmental information of the appliances that have been configured with the network, allocating, based on the environmental information, the appliance that is to be configured with the network to a corresponding one of the at least two appliances that have been configured with the network, comprises:

in accordance with a determination that the network device connected to one of the at least two appliances that have been configured with the network is different from the network device connected to another one of the at least two appliances that have been configured with the network:

for one of the at least two appliances that have been configured with the network, obtaining first signal strength of the network device monitored by the appliance that has been configured with the network, second signal strength of the rest of the at least two appliances that have been configured with the network, and third signal strength of the appliance that is to be configured with the network;

for one of the at least two appliances that have been configured with the network, determining, based on the first signal strength, the second signal strength, and the third signal strength, a priority of allocating the appliance, which is to be configured with the network the appliance, to the appliance, which has been configured with the network; and allocating, based on the priority, the appliance, which is to be configured with the network, to the corresponding one of the at least two appliances that have been configured with the network; and wherein the environmental information comprises signal strength, and in accordance with a determination that the at least two appliances that have been configured with the network are connected to one network device:

obtaining third signal strength of the appliance, which is to be configured with the network and is monitored by one of the at least two appliances that have been configured with the network, is obtained; and allocating, based on the third signal strength, the appliance that is to be configured with the network to the corresponding one of the at least two appliances that have been configured with the network.

10. The electronic device according to claim 9, wherein, the at least two appliances that have been configured with the network comprise a first appliance that has been configured with the network and a second appliance that has been configured with the network;

the network device connected to the first appliance that has been configured with the network is a first network device, and the network device connected to the second appliance that has been configured with the network is a second network device; and while determining, based on the first signal strength, the second signal strength, and the third signal strength, a priority of allocating the appliance, which is to be configured with the network the appliance, to the appliance, which has been configured with the network, the processor is further configured to execute program data stored in the memory to perform operations of:

converting the first signal strength to a first distance, converting the second signal strength to a second distance, and converting the third signal strength to a third distance;

calculating a fourth distance between the appliance that is to be configured with the network and the first network device based on a first distance between the first network device and the first appliance that has been configured with the network, a second distance between the first appliance that has been configured with the network and the second appliance that has been configured with the network, a third distance between the first appliance that has been configured with the network and the appliance that is to be configured with the network, a first distance between the second appliance that has been configured with the network and the first network device, and a third distance between the second appliance that has been configured with the network and the appliance that is to be configured with the network;

calculating a fifth distance between the second appliance, which is to be configured with the network, and the second network device based on a first distance between the second appliance that has been configured with the network and the second network device, the second distance between the second appliance that has been configured with the network and the first appliance that has been configured with the network, the third distance between the second appliance that has been configured with the network and the appliance that is to be configured with the network, a first distance between the first appliance that has been configured with the network and the second network device, and the third distance between the first appliance that has been configured with the network and the appliance that is to be configured with the network;
in response to the fourth distance being less than the second distance, determining that a priority of allocating the appliance that is to be configured with the network to the first appliance that has been configured with the network is higher than a priority of allocating the appliance that is to be configured with the network to the second appliance that has been configured with the network; and
in response to the fourth distance being greater than the second distance, determining that the priority of allocating the appliance that is to be configured with the network to the second appliance that has been configured with the network is higher than the priority of allocating the appliance that is to be configured with the network to the first appliance that has been configured with the network.

11. The electronic device according to claim 10, wherein while allocating, based on the third signal strength, the appliance that is to be configured with the network to the corresponding one of the at least two appliances that have been configured with the network, the processor is further configured to execute program data stored in the memory to perform operations of:
converting the third signal strength into a third distance;
for each appliance that is to be configured with the network, obtaining third distances between the appliance that is to be configured with the network and the at least two appliances that have been configured with the network are obtained, comparing the obtained third distances to each other, and obtaining an appliance, which has been configured with the network and corresponds to a smallest third distance of all obtained third distances;
for each of the at least two appliances that have been configured with the network, allocating a first number of appliances that are to be configured with the network, wherein the first number of appliances correspond to the smallest third distance, and the first number is less than or equal to a preset number;
for each of the at least two appliances that have been configured with the network, in response to the first number being equal to the preset number, determining that allocation of appliances to the appliance that has been configured with the network is completed;
for each unallocated appliance that is to be configured with the network, obtaining the appliance, which has been configured with the network and corresponds to a second smallest third distance of all obtained third distances and is not completed for appliance allocation;
for each appliance, which has been configured with the network and is not completed for appliance allocation, allocating a second number of appliances, which are to be configured with the network and correspond to the second smallest third distance and are not allocated yet, wherein a sum of the second number and the first number is less than or equal to the preset number;
for each appliance, which has been configured with the network and is not completed for appliance allocation, in response to the sum being equal to the preset number, determining that the appliance, which has been configured with the network and is not completed for appliance allocation, is now completed for appliance allocation;
repeating the above operations until all appliances, which are to be configured with the network and are not allocated yet, are allocated;
wherein the preset number is a rounded upward value of a ratio of a total number of appliances that are to be configured with the network to the total number of appliances that have been configured with the network.

12. The electronic device according to claim 9, wherein the processor is further configured to execute program data stored in the memory to perform operations of:
obtaining confirmation information of ownership of network configuration of the appliance that is to be configured with the network, after the network configuration is completed; and
opening, based on the confirmation information, a right of performing operations on the appliance that is to be configured with the network.

13. The electronic device according to claim 9, wherein while taking the corresponding appliance that has been configured with the network to perform network configuration on the appliance, which is to be configured with the network and is allocated to the corresponding appliance that has been configured with the network, the processor is further configured to execute program data stored in the memory to perform operations of:
sending the network configuration request and device information of the appliance, which is to be configured with the network and is allocated, to the corresponding appliance that has been configured with the network, enabling the corresponding appliance that has been configured with the network to be connected to the appliance, which is allocated to the corresponding appliance and is to be configured with the network, based on the network configuration request;
verifying a network-configuration random number, which is sent from the appliance that has been configured with the network, with a network-configuration random number, which is sent from the appliance that is to be configured with the network; and
in response to the verification being successful, binding the appliance that is to be configured with the network to an account corresponding to the appliance that has been configured with the network.

14. The electronic device according to claim 9, wherein, while receiving a network configuration request and determining a plurality of network configuration appliances, the processor is further configured to execute program data stored in the memory to perform operations of:
receiving the network configuration request and obtaining an appliance, which has been configured with the network and has a capability to configure a network;
sending the network configuration request to the appliance, which has been configured with the network, to enable the appliance, which has been configured with the network, to obtain any appliance, which is to be configured with the network and is located within a network configuration range of the appliance that has been configured with the network; and
prompting the obtained appliance that is to be configured with the network to a user, determining an appliance, which is to be configured with the network and is selected by the user from the prompted appliance, as an appliance that is to be configured with the network for current network configuration.

* * * * *